United States Patent
Tsubusaki

(10) Patent No.: US 10,701,274 B2
(45) Date of Patent: Jun. 30, 2020

(54) CONTROLLING ZOOM MAGNIFICATION BASED ON IMAGE SIZE

(71) Applicant: CANON KABUSHIKI KAISHA, Tokyo (JP)

(72) Inventor: Akihiro Tsubusaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/976,171

(22) Filed: Dec. 21, 2015

(65) Prior Publication Data

US 2016/0191812 A1 Jun. 30, 2016

(30) Foreign Application Priority Data

Dec. 24, 2014 (JP) ................ 2014-260109
Oct. 13, 2015 (JP) ................ 2015-202330
Oct. 13, 2015 (JP) ................ 2015-202331

(51) Int. Cl.
*H04N 5/262* (2006.01)
*H04N 5/232* (2006.01)
(Continued)

(52) U.S. Cl.
CPC ......... *H04N 5/23296* (2013.01); *G02B 7/102* (2013.01); *G06K 9/00228* (2013.01);
(Continued)

(58) Field of Classification Search
CPC ................................................ H04N 5/23296
(Continued)

(56) References Cited

U.S. PATENT DOCUMENTS

| 8,594,390 B2 | 11/2013 | Yoshizumi | 382/118 |
| 8,634,000 B2 | 1/2014 | Ishikawa | 348/240.3 |
| 8,817,134 B2 | 8/2014 | Yoshizumi | |
| 8,817,161 B2 | 8/2014 | Hosoe | |

(Continued)

FOREIGN PATENT DOCUMENTS

| CN | 101567973 | 10/2009 |
| CN | 102196171 | 9/2011 |

(Continued)

OTHER PUBLICATIONS

U.S. Appl. No. 14/976,138, filed Dec. 21, 2015. Applicant: Akihiro Tsubusaki.

(Continued)

*Primary Examiner* — Usman A Khan
(74) *Attorney, Agent, or Firm* — Venable LLP

(57) ABSTRACT

A subject detection unit of an imaging apparatus detects a subject image from an image. An automatic zoom control unit performs zoom control according to a size of a subject detected by the subject detection unit. The automatic zoom control unit automatically selects a specific composition among a plurality of compositions and sets a reference size of the subject used to control a zoom magnification based on the selected composition and the size and position of the detected subject. A process of determining a scene using information including a detection result by the subject detection unit, a composition selection process is performed on the determination scene, and one composition is selected from a composition of upper body of the subject, a composition of whole body, a composition of a subject face, and a composition of multiple people.

25 Claims, 25 Drawing Sheets

(51) Int. Cl.
*G02B 7/10* (2006.01)
*G06K 9/00* (2006.01)
*G06K 9/32* (2006.01)

(52) U.S. Cl.
CPC ....... *G06K 9/3216* (2013.01); *H04N 5/23219* (2013.01); *H04N 5/23222* (2013.01); *H04N 5/23293* (2013.01); *G06K 9/00369* (2013.01)

(58) Field of Classification Search
USPC ...................................................... 348/240.1
See application file for complete search history.

(56) References Cited

U.S. PATENT DOCUMENTS

| | | | | |
|---|---|---|---|---|
| 9,025,052 | B2 | 5/2015 | Kimura | ................ H04N 5/2628 |
| 9,077,895 | B2 | 7/2015 | Nagata | |
| 2011/0216225 | A1* | 9/2011 | Yoshizumi | ............. H04N 5/228 |
| | | | | 348/240.3 |
| 2011/0304749 | A1* | 12/2011 | Ishikawa | ............ H04N 5/23296 |
| | | | | 348/240.1 |
| 2012/0038796 | A1* | 2/2012 | Posa | .................. H04N 5/23296 |
| | | | | 348/240.2 |

FOREIGN PATENT DOCUMENTS

| | | |
|---|---|---|
| CN | 102281398 | 12/2011 |
| JP | 2010-074399 | 4/2010 |
| JP | 2011-100010 | 5/2011 |
| JP | 2011-188065 A | 9/2011 |
| JP | 2012-039591 | 2/2012 |
| JP | 2012-95019 A | 5/2012 |
| JP | 2013-074454 A | 4/2013 |

OTHER PUBLICATIONS

U.S. Appl. No. 14/976,111, filed Dec. 21, 2015. Applicant: Seiji Ogawa.
U.S. Appl. No. 14/976,126, filed Dec. 21, 2015. Applicant: Akihiro Tsubusaki.
Office Action dated Apr. 4, 2018 in counterpart Chinese Application No. 201510964709.8, together with English translation thereof.
Office Action dated Jun. 11, 2019 in counterpart Japanese Application No. 2015-202331, together with English translation thereof.

* cited by examiner

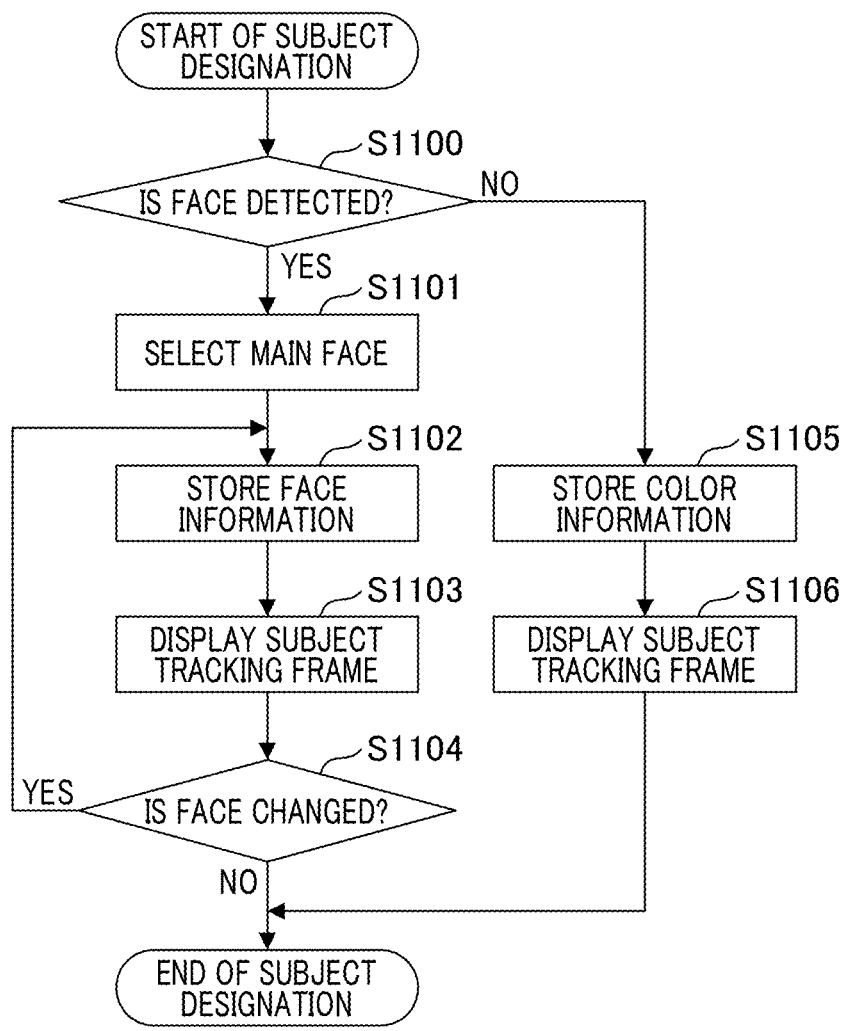

FIG. 19

| Composition | Number of faces for estimating subject position | | |
|---|---|---|---|
| | Shoulder (Ns) | Head (Nh) | Body (Nb) |
| Face | 1 | 1.5 | 1.5 |
| Upper body | 2 | 1.5 | 5 |
| Whole body | 2 | 1.5 | 10 |
| Multiple people | 2 | 1.5 | 3.5 |

FIG. 23

| Composition | Ages | | | |
|---|---|---|---|---|
| | Unauthenticated | 0 to 1 year old | 2 to 12 years old | 13 years old or older |
| Face | 27% | 27% | 27% | 27% |
| Uupper body | 16% | 19% | 16% | 14% |
| Whole body | 7% | 9% | 7% | 6% |

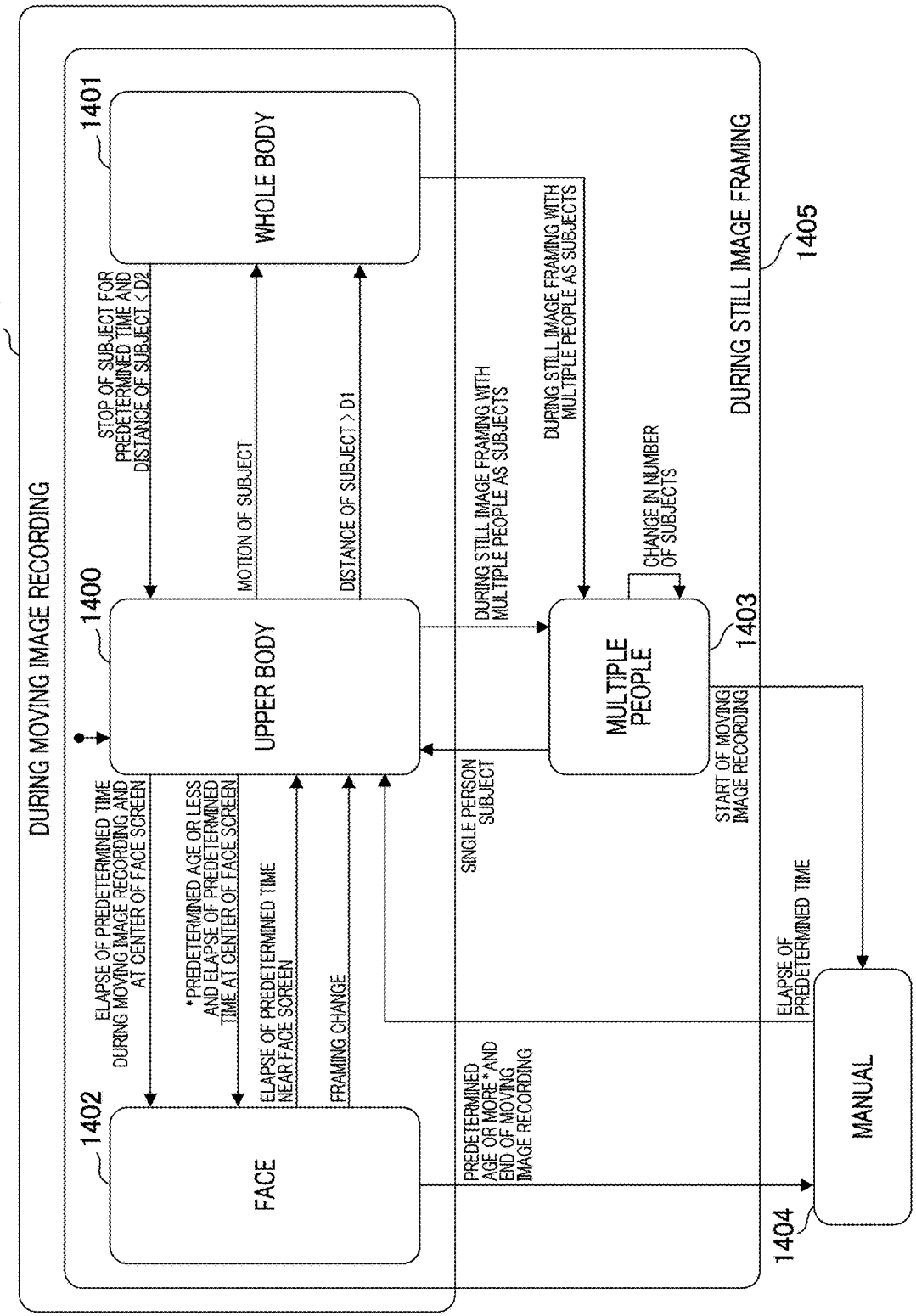

FIG. 25

| Ages | Initial composition | Distance D1 of subject of upper body → whole body | Distance D2 of subject of whole body → upper body | Predetermined time of upper body → face |
|---|---|---|---|---|
| Unauthenticated | Upper body | 30m | 25m | 5.0 seconds |
| 0 year old | Upper body | 30m | 25m | 3.0 seconds |
| 1 to 12 years old | Whole body | 15m | 10m | 5.0 seconds |
| 13 years old or older | Upper body | 30m | 25m | 5.0 seconds |

FIG. 26

| Composition | Ages | | | |
|---|---|---|---|---|
| | Unauthenticated | 0 to 1 year old | 2 to 12 years old | 13 years old or older |
| Face | 1.5 | 1.5 | 1.5 | 1.5 |
| Upper body | 5 | 3.5 | 5 | 6 |
| Whole body | 10 | 9 | 10 | 12 |
| Multiple people | 3.5 | 2.5 | 3.5 | 4.5 |

FIG. 27

| Subject | Moving determination | Composition |
|---|---|---|
| Moving object | Moving | Small |
| | Not moving | Medium |
| Stationary object | — | Large |

CONTROLLING ZOOM MAGNIFICATION BASED ON IMAGE SIZE

BACKGROUND OF THE INVENTION

Field of the Invention

The present invention relates to a technology for detecting a subject image from an image and controlling zoom magnification.

Description of the Related Art

In the related art, there are imaging apparatuses that have a function of driving a zoom lens and performing optical magnification (hereinafter referred to as optical zoom) and a function of expanding a part of a photographed image and performing electronic magnification (hereinafter referred to as electronic zoom). The imaging apparatuses also have an automatic zoom function (automatic magnification) of automatically changing a zoom magnification according to detection information of subjects. Hereinafter, an optical zoom operation and an electronic zoom operation are collectively referred to as a zoom operation.

Japanese Patent Laid-Open No. 2012-95019 discloses the configuration of a camera equipped with an automatic zoom function of constantly maintaining the size of a subject. Japanese Patent Laid-Open No. 2012-95019 discloses a method in which a photographer selects a composition among a plurality of options, "face-up," "bust-up," and "whole body," in an automatic zoom function. In automatic zoom control of maintaining the size of a subject image, the size of the subject image serving as a basis of zoom control is decided based on a selected composition. For example, when a photographer selects the composition "whole body," a zoom operation is performed so that an image of the whole body of a person that is a subject fits in a photographing screen.

In Japanese Patent Laid-Open No. 2012-95019, however, it is necessary to select a composition desired by a photographer in advance in an automatic zoom function. Therefore, whenever a photographing scene or a subject state (a motion, a number, or the like) is changed, it is necessary for the photographer to perform a setting changing manipulation. When setting of the composition is not appropriate for a photographing scene, there is a possibility of a subject not being imaged with an appropriate size. For example, when a composition of "face" is set in a scene in which a moving subject or a distant subject is photographed, there is a possibility of a subject falling outside of a frame. When a composition of "whole body" is set in a scene in which a stopped subject is photographed, there is a possibility of a subject being considerably small in a composition.

When a specific subject is desired to be photographed with the same composition, it is necessary to perform a setting changing manipulation again whenever a subject is changed. For example, when a baby is desired to be photographed with a close-up on his or her "face" or a child is desired to be photographed with the composition of "whole body," the photographer has to manually change setting of the composition when a subject changes.

SUMMARY OF THE INVENTION

The present invention enables automatic zoom control to be performed with a composition suitable for a scene determined based on detection information or authentication information of a subject or an attribute of the determined subject without composition selection of a photographer.

According to an aspect of the present invention, there is provided a zoom control device comprising: a subject detection unit configured to detect a subject image from an image; a composition selection unit configured to automatically select one composition among a plurality of compositions based on information regarding the subject image detected by the subject detection unit; a setting unit configured to set a reference size of the subject image used to control a zoom magnification based on the composition selected by the composition selection unit and a size and a position of the subject image detected by the subject detection unit; and a control unit configured to control the zoom magnification based on the reference size set by the setting unit and the size of the subject image detected sequentially by the subject detection unit.

Further features of the present invention will become apparent from the following description of exemplary embodiments (with reference to the attached drawings).

BRIEF DESCRIPTION OF THE DRAWINGS

FIG. 11 is a flowchart for describing another example of the subject designation process.

FIG. 19 is a table illustrating the number of faces for estimating the subject position.

FIG. 23 is a table illustrating face ratios according to age at the time of subject authentication.

FIG. 24 is a transition diagram for describing automatic composition determination in the composition setting "auto" at the time of the subject authentication.

FIG. 25 is a table illustrating an initial composition and a transition condition of the composition at the time of the subject authentication.

FIG. 26 is a table illustrating the number of faces for which a body position is estimated at the time of the subject authentication.

FIG. 27 is a table illustrating composition selection for each kind of subject at the time of the subject authentication.

DESCRIPTION OF THE EMBODIMENTS

Figure 1:
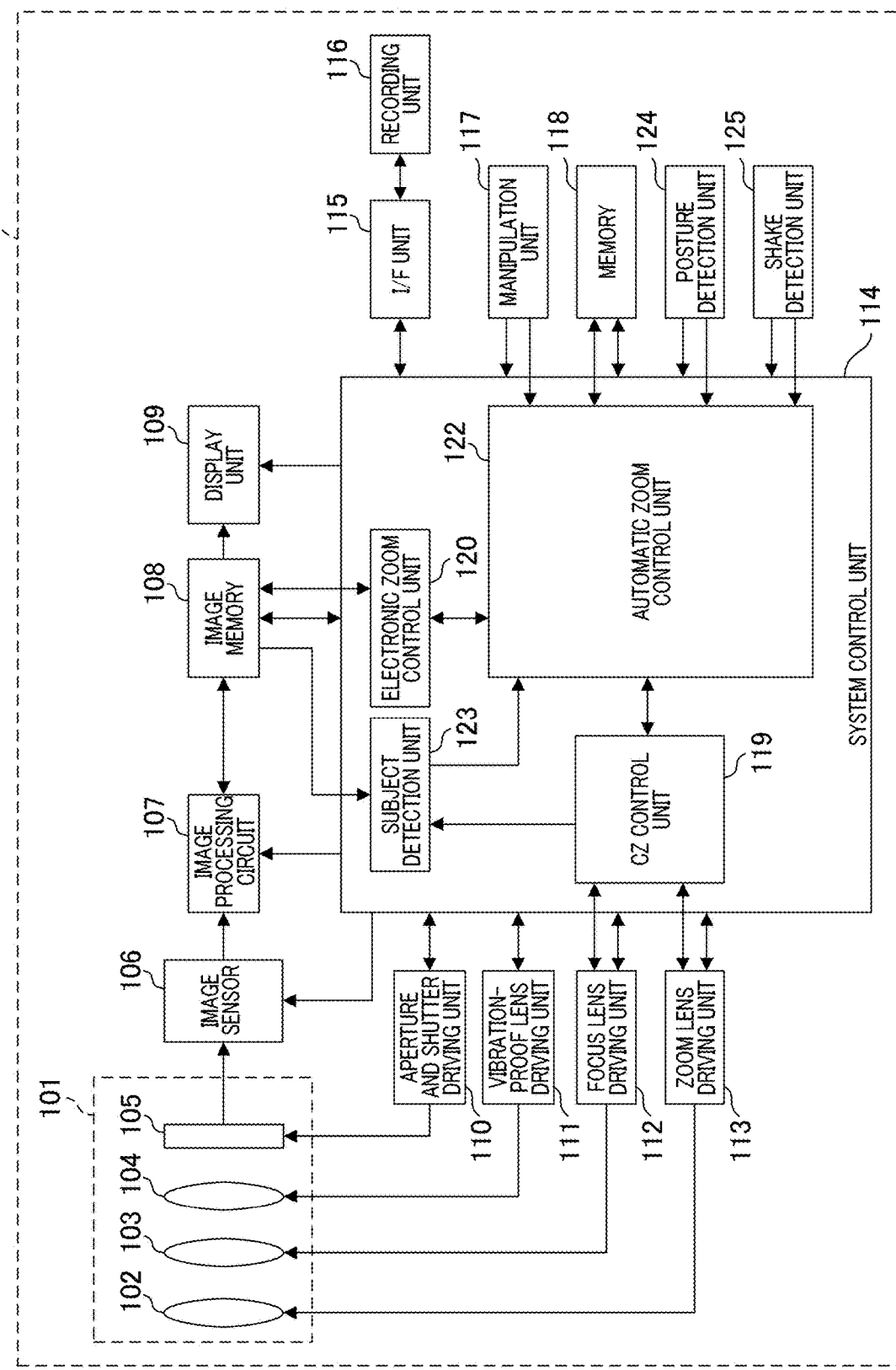
FIG. 1 is a block diagram illustrating an example of the configuration of a digital camera according to an embodiment of the present invention.

Hereinafter, an embodiment of the present invention will be described in detail according to the appended drawings. FIG. 1 is a block diagram illustrating an example of the configuration of a digital camera 100 that has an automatic zoom function and is an example of an imaging device including a zoom control device according to the embodiment.

A lens group is held in a lens barrel 101. A zoom lens 102 is moved in an optical axis direction of the lens barrel 101 to adjust a focal distance and optically change an angle of view (move a zoom position). A focus lens 103 is moved in the optical axis direction of the lens barrel 101 to perform focusing. A vibration-proof lens (image blur correction lens) 104 corrects image blur caused due to camera shake or the like. An aperture and shutter 105 that adjust an amount of light are used for exposure control. In the embodiment, the digital camera 100 is an imaging apparatus in which the lens barrel 101 and a camera body are integrated, but the invention is not limited thereto. The embodiment can also be applied to an imaging system configured to include a camera body and an interchangeable lens detachably mounted on the camera body.

An image sensor 106 generates an imaging signal by receiving light passing through the lens barrel 101 and converting a subject image into an electric signal through photoelectric conversion. The image sensor 106 is, for example, a charge-coupled device (CCD) type or a complementary metal oxide semiconductor (CMOS) type image sensor. The imaging signal generated by the image sensor 106 is input to an image processing circuit 107 and is subjected to various processes such as a pixel interpolation process and a color conversion process. Image data after the various processes is stored in an image memory 108. The image memory 108 is a storage device such as a dynamic random access memory (DRAM) or a static random access memory (SRAM).

The display unit 109 is configured to include a thin film transistor (TFT) drive type liquid crystal display (LCD) and displays a photographed image (image data) or specific information (for example, photographed information). An electronic viewfinder (EVF) function by which a photographer performs alignment of an angle of view can be provided through information display such as live view related to a photographed image.

An aperture and shutter driving unit 110 calculates exposure control values (an aperture value and a shutter speed) based on luminance information obtained through image processing in the image processing circuit 107 and drives the aperture and shutter 105 based on a calculation result. In this way, automatic exposure (AE) control is performed. A vibration-proof lens driving unit 111 calculates a deflection amount applied to the digital camera 100 based on deflection detection information by an angular velocity sensor such as a gyro sensor. Depending on the calculation result, the vibration-proof lens 104 is driven so that the deflection amount applied to the digital camera 100 is cancelled (reduced).

A focus lens driving unit 112 drives the focus lens 103. In the embodiment, the digital camera 100 performs automatic focusing (AF) control according to a contrast scheme. That is, based on focusing information (contrast evaluation value) of a photographing optical system obtained through image processing in the image processing circuit 107, the focus lens driving unit 112 drives the focus lens 103 so that a subject comes into focus. However, the invention is not limited thereto, but a phase difference AF scheme may be used as the AF control instead of the contrast scheme. Further, the AF control may be performed according to a plurality of schemes such as a combination of the contrast scheme and another scheme.

A zoom lens driving unit 113 drives the zoom lens 102 according to a zoom manipulation instruction. A manipulation unit 117 includes a zoom lever or a zoom button as a zoom manipulation member used for the photographer to instruct the camera to perform zooming. A system control unit 114 performs control of detecting a manipulation amount and a manipulation direction of the zoom manipulation member used for a zoom instruction manipulation, calculating a zoom driving speed or a zoom driving direction, and moving the zoom lens 102 in an optical axis according to a calculation result.

Image data generated through a photographing operation is transmitted to a recording unit 116 via an interface (I/F) unit 115 to be stored. The image data is recorded in one or both of an external recording medium and a nonvolatile memory 118. The external recording medium is, for example, a memory card that is mounted on the digital camera 100 for use. The nonvolatile memory 118 is a storage medium embedded in the digital camera 100. The memory 118 stores not only program data or image data but also setting information of the digital camera 100 or information regarding a zoom-in position or the like in an automatic zoom function to be described below.

A manipulation unit 117 includes a release switch for instructing photographing start and an automatic zoom manipulation switch for instructing start or end of the automatic zoom function in addition to the foregoing zoom manipulation member. A signal from the manipulation unit 117 is transmitted to the system control unit 114.

The system control unit 114 includes a calculation device such as a central processing unit (CPU). The system control unit 114 controls the entire digital camera 100 by transmitting a control command to each unit in response to a manipulation of the photographer. The system control unit 114 executes various control programs stored in the memory 118, for example, programs for performing control of the image sensor 106, AE/AF control, zoom control (including an automatic zoom process), and the like.

Figure 2:
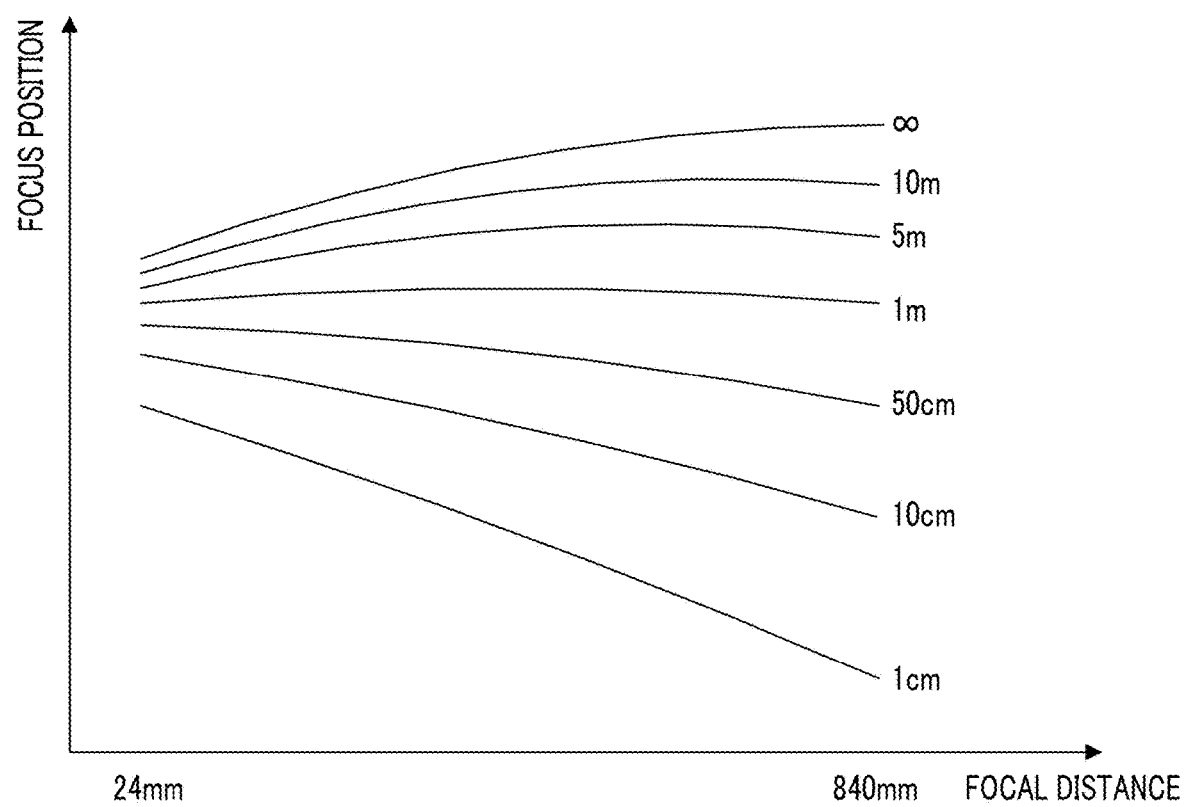
FIG. 2 is a diagram exemplifying a relation between a focal distance and the position of a focus lens for each subject distance.

To maintain a focused state when an angle of view is changed through optical zoom, it is necessary to move the focus lens 103 to an appropriate focus position according to the position of the zoom lens 102 when the lens barrel 101 is of a rear focus type. Such control is referred to as computer zoom (CZ) control and is performed by a CZ control unit 119 in the system control unit 114. FIG. 2 is a diagram exemplifying a relation between a focal distance of the zoom lens and a focus position for each subject distance. In FIG. 2, the relation between the focal distance of the zoom lens and the focused focus position is graphed as a data table indicated for each distance up to a subject. In the embodiment, the table is referred to as a focus cam table. In FIG. 2, the horizontal axis represents the focal distance corresponding to the zoom position and the vertical axis represents the focus position. A distance (subject distance) from the digital camera 100 to a subject is exemplified on the side of each graph line.

The system control unit 114 performs a scan operation by controlling the focus lens driving unit 112 and moving the focus lens 103 within a predetermined range when the AF control is performed. A focus position which is a focused point is detected using a contrast evaluation value or the like obtained during a scan operation according to a known method. A subject distance is measured using the zoom position and the focus position at that time with reference to the focus cam table.

Next, control related to the automatic zoom function in the system control unit 114 will be described. As illustrated in FIG. 1, the system control unit 114 includes the CZ control unit 119, an electronic zoom control unit 120, an automatic zoom control unit (hereinafter referred to as an AZ control unit) 122, and a subject detection unit 123.

The digital camera 100 has an optical zoom function and an electronic zoom function, and the CZ control unit 119 and the zoom lens driving unit 113 serve to control the optical zoom. The CZ control unit 119 detects a zoom position of the zoom lens 102 for each predetermined control period at the time of a zoom operation. Then, the CZ control unit 119 performs control of driving the focus lens 103 to track the focus cam table at a subject distance measured in the AF control according to the detected zoom position. In this way, it is possible to perform the optical zoom operation while maintaining the focused state.

On the other hand, the electronic zoom control unit 120 and the image memory 108 serve to control the electronic zoom. The electronic zoom control unit 120 realizes the electronic zoom function by clipping data in a target region from image data transmitted to the image memory 108. The electronic zoom control unit 120 realizes smooth electronic zoom display by causing the display unit 109 to perform display while gradually increasing a range clipped at a frame rate period of an image captured in the image sensor 106.

The subject detection unit 123 detects a desired subject region from image data stored in the image memory 108. In the embodiment, a subject detection method (a face detection process or a color detection process) of detecting a subject (the face of a person or the like or an object) based on face information or color information included in the image data will be described.

The face detection process is a process of detecting a face region present in image data by a known algorithm. For example, the subject detection unit 123 extracts a feature amount from a rectangular partial region on the image data and compares the feature amount to a feature amount of a face prepared in advance. Then, the subject detection unit 123 determines that the partial region is a face region when a correlation value of both features exceeds a predetermined threshold value. By repeating this determination process while changing a combination of a size, a disposition position, and a disposition angle of the partial region, it is possible to detect various face regions present in the image data.

In the color detection process, a process of storing color information of a subject region designated according to a subject designation method to be described below as a feature color is performed. The color detection process is performed when a detection target subject is an object ("object" other than a person). For example, an RGB signal or a luminance signal (Y signal) which are output signals from the image processing circuit 107 and a color difference (R-Y or B-Y) signal are used as the color information. When a subject is detected, the subject detection unit 123 divides image data into a plurality of partial regions and calculates an average value of luminance and color differences for each partial region. The subject detection unit 123 compares feature color information stored in advance to color information of each region at the time of the detection of the subject and sets a partial region in which a difference between the luminance and the color difference is equal to or less than a predetermined amount as a candidate for a subject region. A process of setting a group of partial regions mutually adjacent in the candidate of the subject region as a same-color region and setting a region in which the same-color region is within a predetermined size range as a final subject region is performed.

In the embodiment, a case in which the subject detection unit 123 has a function of registering information regarding a subject and a function of authenticating the subject will be described, but a registration unit and an authentication unit may be independently provided. That is, the registration unit performs processes of acquiring image information of the subject and registering the image information in association with attribute information of the subject in a storage unit. The subject authentication unit performs correlation calculation of correlating a feature amount of the detected subject image and a feature amount of the subject image obtained from the image information of the subject registered in advance and performs an authentication process for the subject based on a correlation value.

Next, an authentication method (a face authentication process and an object authentication process) of determining an attribute of the detected subject in the subject detection unit 123 will be described. In the face authentication process, a process of registering a face image of a person which is a photographing target and attributes (a name, an age, a date of birth, a sex, an initial composition, and the like) of the face in advance is performed. A pattern matching process is performed on all of the registered face images and the face images detected through the face detection process by a known algorithm. A process of authenticating the registered face image with the highest correlation value as a detected face is performed. When the correlation values of all the registered face images are less than a predetermined value, the detected face is determined to be an unregistered face. Accordingly, it is possible to specify the attributes of the person who is the photographing target. On the other hand, in the object authentication process, a process of storing an image of an object other than the person who is the photographing target as a template image in the memory 118 is performed. For example, there is a method of storing representative subjects such as airplanes, electric trains, birds, and the moon as template images in advance or a method of registering images photographed by the photographer as template images. To improve detection performance, a process of storing images of the same object at different angles or with different colors as a plurality of pieces of image data is performed. Further, a process of registering attribute information (kind, determination information whether an object is moving or stationary, a setting composition, and the like) of an object corresponding to the template image is performed. In addition to color information of an object region detected in the color detection process, pattern matching is performed on shape information, texture information, or the like with the registered template images. A process of authenticating an image with the highest correlation value as a detected object is performed. When correlation values of all the template images are less than a predetermined value, a detected object region is determined to be an unregistered object. Accordingly, it is possible to specify the attributes of the object which is a photographing target.

The subject detection unit 123 calculates the size of the subject region in the image data using subject distance information measured by the CZ control unit 119 and focal distance information of the zoom lens 102. A posture detection unit 124 detects a posture (for example, normal position/grip-up/grip-down) of the digital camera 100 based on information of an acceleration sensor. A shake detection unit 125 detects a deflection state of the digital camera 100 based on angular velocity information or the like by a gyro sensor by determination. The shake detection unit 125 determines that the camera is handheld when a deflection amount (detected value) applied to the gyro sensor or the like is equal to or greater than a predetermined amount (threshold value), and determines that the camera is fixed on a tripod or the like when the deflection amount is less than the predetermined amount. Sensors of a detection unit that acquires control information of the vibration-proof lens driving unit 111 may also be configured to be used as the acceleration sensor and the gyro sensor used to detect the posture and detect the shake.

Next, an overview of the automatic zoom function and the AZ control unit 122 according to the embodiment will be described. In a camera not equipped with the automatic zoom function, the following manipulation is necessary, for example, when a subject moves and falls outside of the frame while the photographer performs framing in a telephoto state and waits to take a picture.

First, the photographer performs a zoom-out operation by manipulating the zoom manipulation member, and then searches for a subject. After the photographer searches for the subject, the photographer performs a zoom manipulation again to adjust an angle of view until the angle of the view becomes a desired angle of view. For example, when the size of a subject image changes due to movement of the subject, the photographer necessarily manipulates the zoom manipulation member to adjust the size of the subject image.

Conversely, in a camera equipped with the automatic zoom function, the photographer performs a manipulation of designating a subject on a touch panel or the like to designate a subject desired to be photographed after setting the automatic zoom function. When the automatic zoom function is set, a zoom operation is automatically performed so that the designated subject has a predetermined size near the center of an image. As the method of designating a subject, in addition to the touch panel manipulation, for example, there is a method of designating a subject near the center of a screen when the photographer manipulates a specific button or a method of automatically selecting a main subject among subjects detected by a camera.

The subject detection unit 123 calculates the position or size of a subject region designated from the image memory 108 in image data. A motion of a subject can be tracked by performing this process on sampled image data continuously whenever an image is displayed as a live view. The AZ control unit 122 starts the zoom-out operation when an image of a subject being tracked is detected in a zoom-out region to be described below or when an image of the detected subject becomes greater than a predetermined size. That is, the AZ control unit 122 instructs the CZ control unit 119 or the electronic zoom control unit 120 to perform zoom-out in a wide angle direction. When the subject is detected in a zoom-in region and the subject image fits within a range of a predetermined size, a zoom-in operation is performed to the telephoto side. Through such a process, the photographer may operate the camera without worrying about the zoom operation so that an image of a desired subject fits in a screen. Even when the subject falls outside of the frame, a zoom magnification is automatically changed. Therefore, it is possible to perform alignment of an angle of view more simply.

Figure 3:
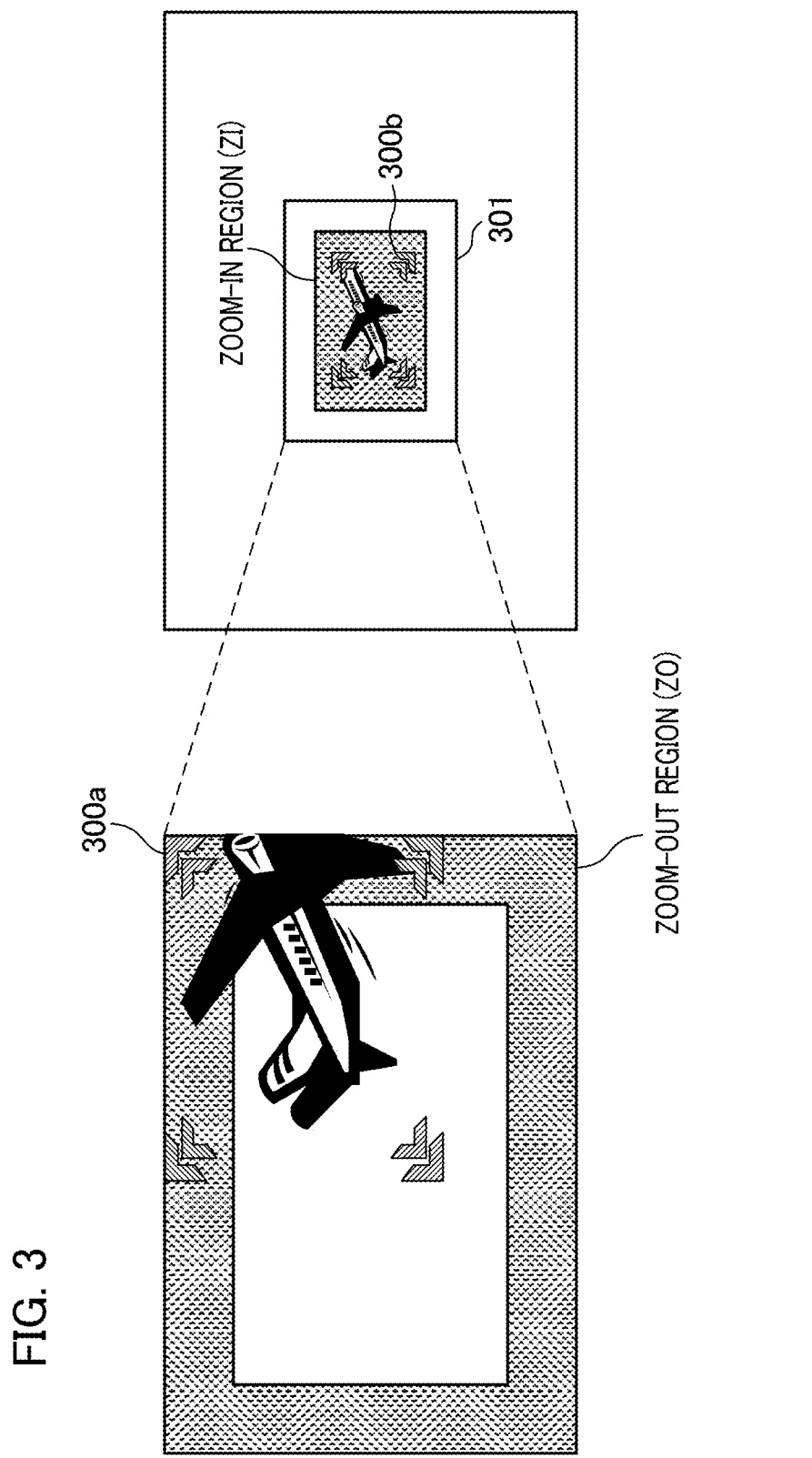
FIG. 3 is explanatory diagrams illustrating a process of preventing a subject (object) from falling outside of a screen.
Figure 4A:
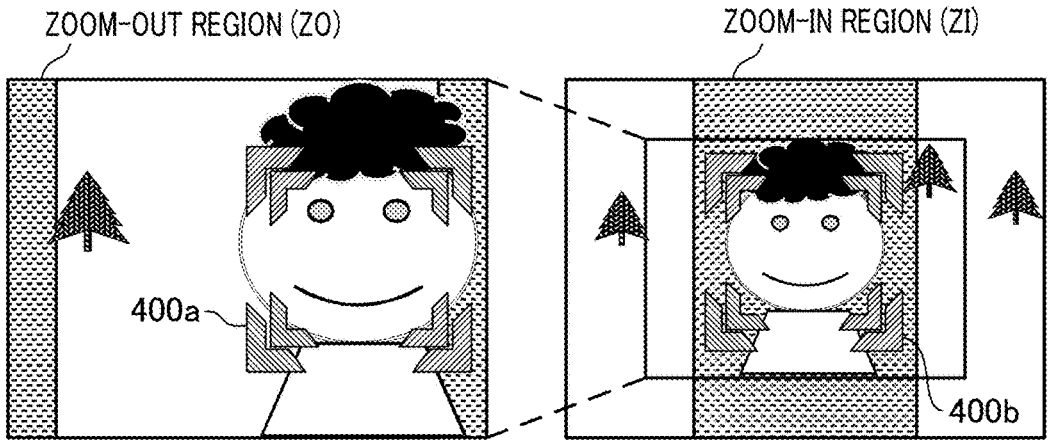
FIGS. 4A to 4C are explanatory diagrams illustrating a process of preventing a subject (person) from falling outside of a screen.
Figure 4B:
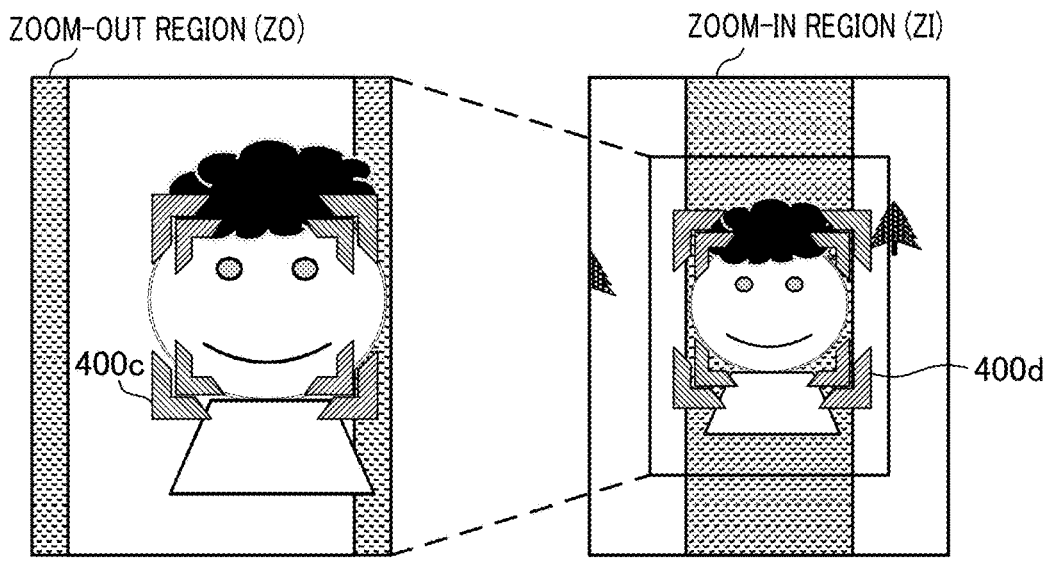
Figure 4C:
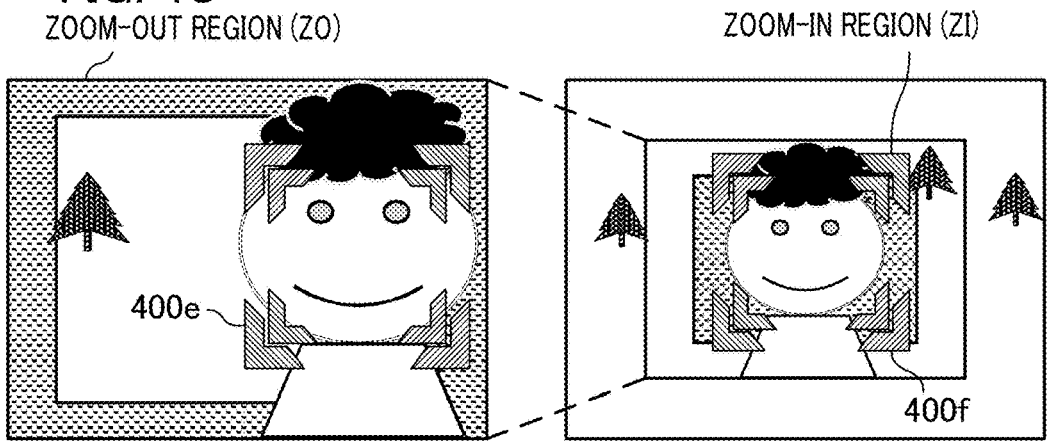

Next, start conditions of a zoom-out operation or a zoom-in operation will be described with reference to FIGS. 3 to 5B. FIG. 3 is explanatory diagrams illustrating a process of preventing a subject (object) from falling outside of a screen. FIGS. 4A to 4C are explanatory diagrams illustrating a process of preventing a subject (person) from falling outside of a screen.

In FIGS. 3 to 4C, frames 300a and 300b are first tracking frames (hereinafter referred to as object tracking frames) for tracking a subject (object) and frames 400a to 400f are second tracking frames (hereinafter referred to as face tracking frames) for tracking a subject (the face of a person). Hereinafter, for descriptions that could apply to a person or an object, the object tracking frame and the face tracking frames are collectively referred to as a subject tracking frame in some cases. The subject tracking frame is displayed to surround a subject image on an electronic viewfinder screen (EVF screen) of the display unit 109 so that the photographer can see a designated subject. The position and size of the subject tracking frame on the screen is calculated based on the face information and the color information by the subject detection unit 123 and is updated at a frame rate period.

A process of preventing a subject (airplane) from falling outside of a screen will be described with reference to FIG. 3. A zoom-out region ZO (hereinafter referred to as a ZO region) in a left figure of FIG. 3 indicates a region more outside than a predetermined ratio in the entire angle of view (entire screen) displayed by the EVF. For example, the central point of the screen is 0% and the entire screen is 100%, and a case in which a position located at 80% of the entire screen is set as a boundary of the ZO region is assumed. In this case, a region of 80% to 100% of the entire screen is the ZO region. When a part of the object tracking frame 300a enters the ZO region, the AZ control unit 122 performs control such that a zoom-out operation starts. The AZ control unit 122 stores a zoom magnification (corresponding to a zoom-in angle of view) before zoom movement in the memory 118. A target zoom magnification or a zoom speed during a zoom-out operation are set in advance according to the size of a subject image or a movement speed. The target zoom magnification or the zoom speed may be appropriately calculated according to the size of a subject image or the movement speed. The zoom-out operation is performed according to the target zoom magnification or the zoom speed. In this way, it is possible to efficiently prevent a subject from falling outside of the frame.

A right figure of FIG. 3 illustrates an angle of view when a zoom-out operation corresponding to a predetermined zoom change amount is performed from the angle of view in the left figure of FIG. 3. A zoom-in region ZI (hereinafter referred to as a ZI region) illustrated in the right figure of FIG. 3 indicates a region more inside than a predetermined ratio at a zoom-in angle of view (an angle of view before zoom-out) 301 in a subject search state. For example, the central point of the screen is 0% and the zoom-in angle of view 301 is 100%, and a case in which a position located at 70% of the zoom-in angle of view 301 is set as a boundary of the ZI region is assumed. In this case, a region of 0% to 70% of the entire zoom-in angle of view 301 is the ZI region. At this time, for example, when a zoom-out magnification is ½, the zoom-in angle of view 301 has a size of 50% of the entire screen. Accordingly, the boundary of the ZI region is 70%×(½)=35% of the entire screen. The ZI region can also be said to be a region of 0% to 35% of the entire screen. When the photographer changes a direction of the camera so that the object tracking frame 300b fits in the ZI region, the AZ control unit 122 performs control such that a zoom-in operation starts.

Next, a process of preventing a subject (person) from falling outside of a screen will be described with reference to FIGS. 4A to 4C. When a subject is a person and a part of the face tracking frame enters the ZO region, a zoom-out operation starts. When the face tracking frame fits in the ZI region, a zoom-in operation is performed. The case in which a subject is a person is different from the case in which a subject is an object. Thus, since a movement direction of the subject can be predicted to some extent, the ZO region and the ZI region are set according to a region in the predicted movement direction. In photographing in the handheld state, a subject may fall outside of the frame due to an influence of camera shake or the like. However, when the subject falls outside of the frame due to camera shake or the like, the photographer can include the subject in the frame again by performing an operation of including the subject in the frame. Here, when a ZO region is set in an upper portion of the screen and a person is disposed near the center to perform photographing, the face tracking frame enters the ZO region and the subject may fall outside of the frame unintentionally. Accordingly, when a subject is a person in the handheld state (a state in which the photographer holds the camera), no ZO region is set in an upper portion of the screen in consideration of a framing operation of the photographer.

In this way, in the embodiment, when the subject detection unit 123 detects a face, the AZ control unit 122 changes the ZO region and the ZI region according to a posture of the camera or a shake state. The posture of the camera is detected by the posture detection unit 124 and the shake state is determined from a detection result obtained by the shake detection unit 125. The detection result obtained by the shake detection unit 125 refers to a detection result indicating whether the camera is in the handheld state. Hereinafter, this will be described specifically with reference to FIGS. 4A to 4C.

FIG. 4A illustrates a ZO region and a ZI region set when the photographer holds the camera and poses at a normal position. In such a photographing scene, when a subject moves in a horizontal direction and falls outside of the frame, the position of the subject in a screen moves in the horizontal direction (longitudinal direction) of the screen at the normal position. Thus, both of the ZO region and the ZI region are arranged in a vertical belt-like shape in the vertical direction (transverse direction) with respect to the screen at the normal position. The ZO region is set in the vertical belt-like shape located on both end sides in the horizontal direction in a horizontally long rectangular screen. The ZI region is set in the vertical belt-like shape located in the central portion of the screen. In this case, when the face tracking frame 400a enters the ZO region, the AZ control unit 122 determines that zoom-out starts and performs control of the zoom-out operation corresponding to a predetermined zoom magnification. When the face tracking frame 400b is included in the ZI region, the AZ control unit 122 determines that zoom-in starts and performs control of the zoom-in operation corresponding to a predetermined zoom magnification up to a zoom return position. By setting the ZO region and the ZI region in this way, it is possible to efficiently prevent the subject (person) from falling outside of the frame.

FIG. 4B illustrates the ZO region and the ZI region set when the posture of the camera is changed in the same photographing scene and the photographer poses the camera in a vertical position state of grip-down or grip-up. In this case, the ZO region and the ZI region are arranged in vertical belt-like shapes in the vertical direction (longitudinal direction) of a screen at a vertical position. That is, the ZO region is set in the vertical belt-like shape located on both end sides in the horizontal direction in a vertically long rectangular screen. The ZI region is set in the vertical belt-like shape located in the central portion of the screen. In this case, when the face tracking frame 400c enters the ZO region, the AZ control unit 122 determines that zoom-out starts and performs control of the zoom-out operation corresponding to a predetermined zoom magnification. When the face tracking frame 400d is included in the ZI region, the AZ control unit 122 determines that zoom-in starts and performs control of the zoom-in operation corresponding to a predetermined zoom magnification up to a zoom return position. By setting the ZO region and the ZI region in this way, it is possible to detect the motion of the subject in the horizontal direction and efficiently prevent the subject (person) from falling outside of the frame.

FIG. 4C illustrates the ZO region and the ZI region set when a detection state of the shake detection unit 125 is a fixed state. The fixed state refers to a state in which the camera is fixed on a tripod or the like, and there is no possibility of a subject falling outside of the frame due to camera shake. When a zoom-in operation is performed while a subject is not framed near the center of a screen, there is a possibility of the subject falling outside of the frame due to the zoom-in operation. Accordingly, the ZO region is set in the entire periphery portion of the screen and the ZI region is set further inside than a zoom-in angle of view. That is, the ZO region is set in a rectangular belt-like shape located on the corner sides in the vertical and horizontal directions of the screen. The ZI region is set in a rectangular shape located in the center of the screen. In this case, when a face tracking frame 400e enters the ZO region, the AZ control unit 122 determines that zoom-out starts and performs control of the zoom-output operation corresponding to a predetermined zoom magnification. When a face tracking frame 400f is included in the ZI region, the AZ control unit 122 determines that zoom-in starts and performs control of the zoom-in operation corresponding to a predetermined zoom magnification up to a zoom return position.

In the embodiment, as described above, the range of each of the ZO region and the ZI region is dynamically changed according to a change in the posture of the camera or the photographing state (handheld state/fixed state). In this way, it is possible to efficiently prevent a subject from falling outside of a frame while preventing an erroneous operation due to camera shake or the like. Further, the ZO region or the ZI region may be changed according to one of the posture of the camera and the photographing state (handheld state/fixed state) or only one of the ZO region and the ZI region may be changed.

Figure 5A:
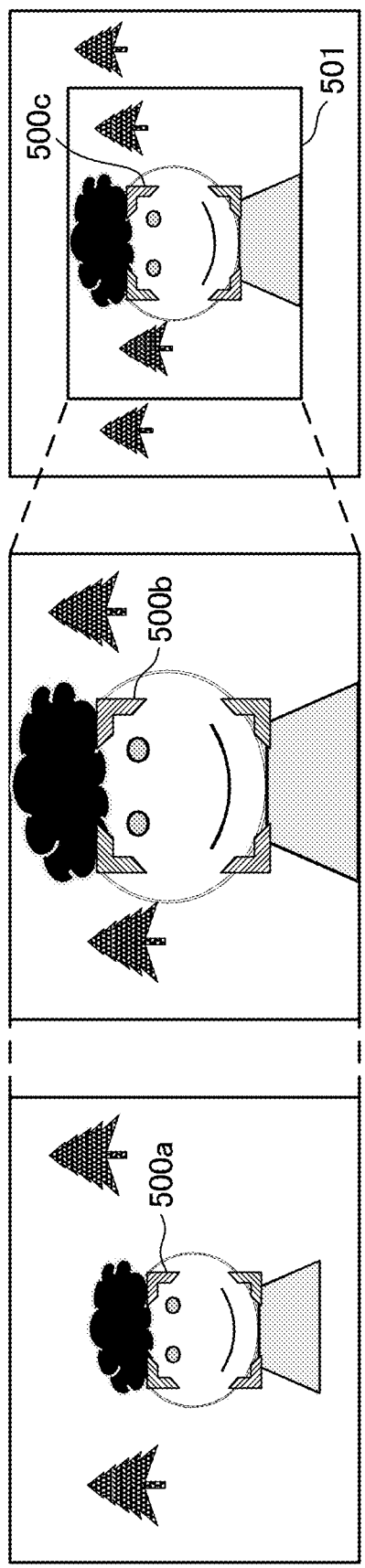
FIGS. 5A and 5B are explanatory diagrams illustrating a process of preventing a change in a size of a subject (person) inside a screen.
Figure 5B:
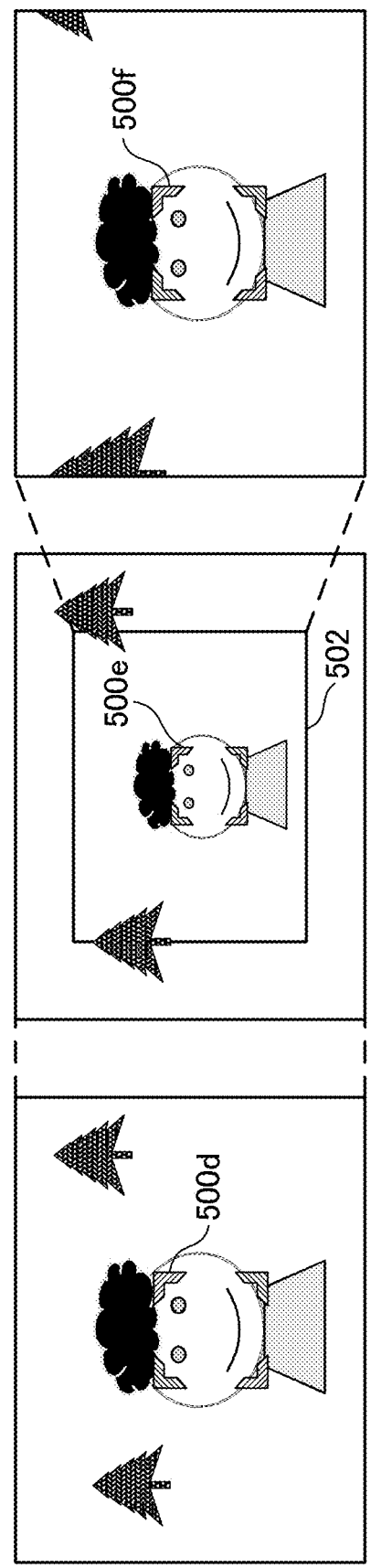

Next, a zoom operation of maintaining a ratio of a subject image to a screen within a predetermined range will be described. In the embodiment, control (size maintenance control) is performed so that the size of the subject image is maintained within the predetermined range from a reference size by automatically performing a zoom operation when the size of the detected subject image exceeds a predetermined multiple of the reference size. FIGS. 5A and 5B are diagrams for describing a process of maintaining the size of a subject (person) image in a screen. FIGS. 6A to 6E are explanatory diagrams of composition setting of a subject (person).

Figure 6A:
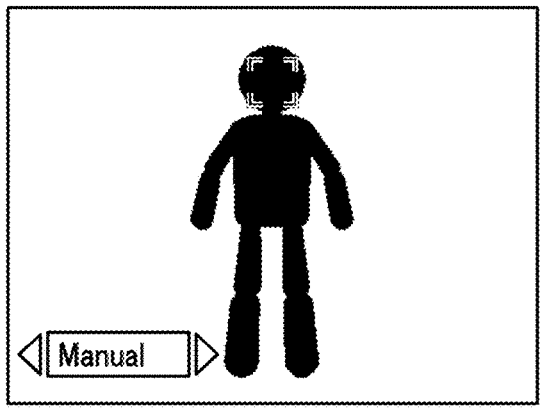
FIGS. 6A to 6E are diagrams for describing composition setting when a subject is a person.
Figure 6B:
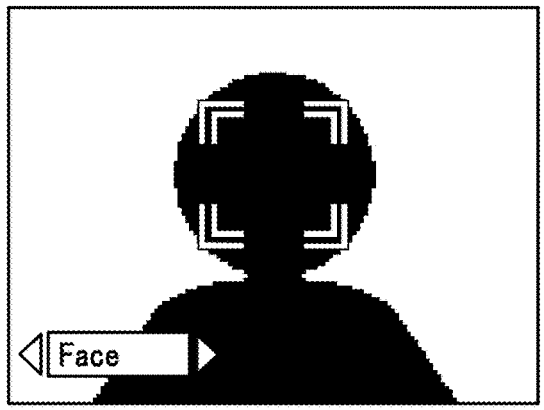
Figure 6C:
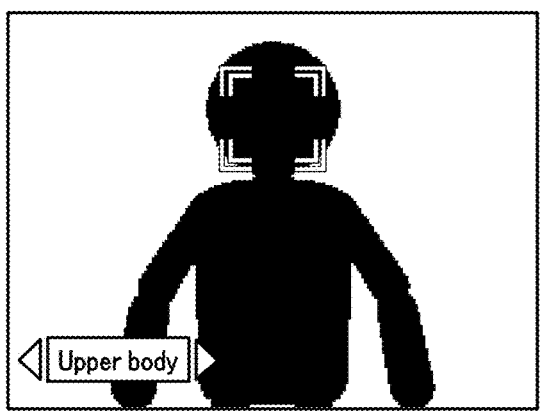
Figure 6D:
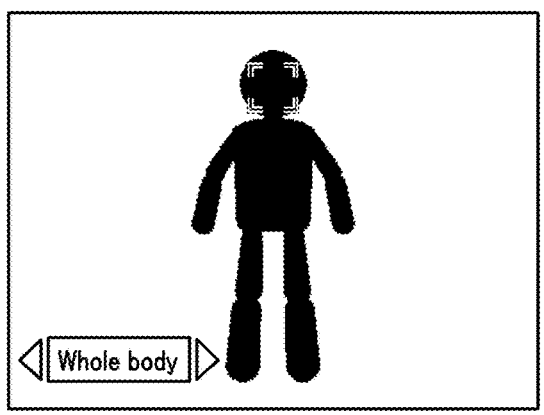

First, setting of a range (composition) in which a tracking target subject fits in a screen will be described with reference to FIGS. 6A to 6E. FIG. 6A exemplifies screen display when composition setting is setting of "manual." In the "manual" setting, the photographer changes the size of a face tracked when the photographer performs a manual zoom operation through a zoom lever manipulation while viewing an image of a person on a screen. The size of the subject image at that time is stored as a reference size in the memory 118. FIG. 6B exemplifies screen display when the composition setting is setting of "face." In the composition setting of "face," a size with which a face fits in the screen in accordance with a posture of the camera or a direction of the face is calculated as a reference size and is stored in the memory 118. Similarly, FIG. 6C exemplifies screen display when the composition setting is setting of "upper body" and FIG. 6D exemplifies screen display when the composition setting is setting of "whole body." A reference size is calculated so that the reference size is a size set on each screen and is stored in the memory 118.

Figure 6E:
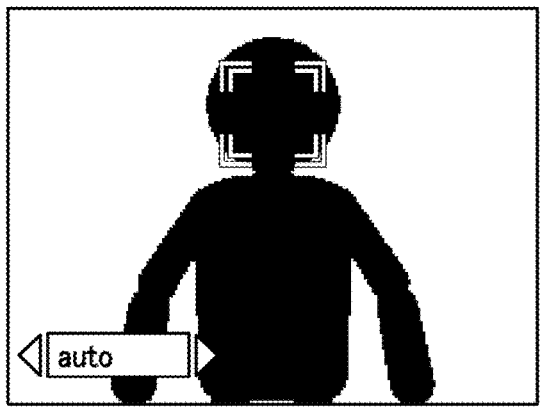

FIG. 6E exemplifies screen display when the composition setting is setting of "auto." In the "auto" setting, the AZ control unit 122 determines an appropriate composition based on a subject position, a subject size, the number of subjects, a posture of the camera, or the like in the screen. The reference size is calculated so that the determined composition is realized and is stored in the memory 118. A method of calculating the reference size will be described below with reference to FIG. 12.

The photographer can perform a manipulation of changing the composition setting by manipulating left and right buttons of the manipulation unit 117 on a photographing screen or performing selection on a setting menu. When the photographer performs the manipulation of changing the composition setting, the AZ control unit 122 updates information regarding the composition setting stored in the memory 118. FIGS. 6A to 6E illustrate the composition setting examples of "manual," "face," "upper body," and "auto" when the subject is a person, but the setting of the composition is not limited thereto. Only some of the five exemplified compositions may be set or other compositions may be included. When a subject is an object, for example, compositions of "manual," "large," "medium," "small," and "auto" may be set.

A case in which the composition setting is "manual" will be described as an example with reference to FIGS. 5A and 5B in the zoom operation of maintaining the ratio of the subject image to the screen within the predetermined range. FIG. 5A exemplifies a zoom operation performed automatically by the camera when a subject (person) approaches the camera. This is a zoom-out operation of fitting the ratio of the subject image to the screen within the predetermined ratio. In FIGS. 5A and 5B, face tracking frames 500a to 500f are displayed to surround a face region as a feature region of the person who is the subject. Accordingly, the size of the face tracking frame will be described as a subject size herein.

A left figure of FIG. 5A illustrates an angle of view when a subject is designated according to a subject designation method to be described below. The size of the face tracking frame 500a at the time of the designation of the subject is stored as a reference subject size (reference size) in the memory 118. A center figure of FIG. 5A illustrates an angle of view when the subject approaches the camera when the zoom magnification is not changed from the state of the left drawing in the left figure of FIG. 5A. For example, a size which is 150% of the size of the face tracking frame 500a which is the reference subject size is set as a start size of the zoom-out operation. When a relation between the subject tracking frames (face tracking frames) is "face tracking frame 500b>face tracking frame 500a×150%," that is, the tracking frame is changed with respect to the reference size more than a predetermined change amount, the AZ control unit 122 determines that the zoom-out operation starts.

A right figure of FIG. 5A shows an angle of view zoomed out from the angle of view 501 in the center figure of FIG. 5A by a predetermined zoom magnification and the face tracking frame 500c. Here, the predetermined zoom magnification is set to 1/1.5 in consideration of a change ratio (150%) of the size of the face tracking frame at the time of the start of the zoom-out operation with respect to the reference subject size. Thereafter, when the subject further approaches the camera, the zoom-out to the wide angle side is further performed so that the subject image can continuously fit within the predetermined ratio. Accordingly, the photographer can concentrate on manipulating the release switch.

In contrast, FIG. 5B exemplifies a zoom operation performed automatically by the camera when the person who is a subject moves away from the camera. This is a zoom-in operation of fitting a ratio of the subject image to the screen within a predetermined range. A left figure of FIG. 5B shows an angle of view when a subject is designated according to a subject designation method to be described below. The size of the face tracking frame 500d at the time of the designation of the subject is stored as a reference subject size in the memory 118 (when the composition setting is "manual").

A center figure of FIG. 5B shows an angle of view when the subject moves away from the camera when the zoom magnification is not changed from the state of the left figure of FIG. 5B. For example, a size which is 50% of the size of the face tracking frame 500d which is the reference subject size is set as a start size of the zoom-in operation. When a relation between the face tracking frames is "face tracking frame 500e>face tracking frame 500d×50%," the tracking frame is determined to be changed with respect to the reference size more than a predetermined change amount. When the determination condition is satisfied and the face tracking frame 500e is included in the ZI region, the AZ control unit 122 determines that the zoom-in operation starts. Here, the ZI region is set further inside than an angle of view 502 zoomed in by a predetermined zoom magnification with respect to the angle of view of the center figure of FIG. 5B.

A right figure of FIG. 5B shows an angle of view (corresponding to the angle of view 502) zoomed in from the angle of view in the center figure of FIG. 5B by the predetermined zoom magnification and the face tracking frame 500f. Here, the predetermined zoom magnification is set to 1/0.5 in consideration of a change ratio (50%) of the size of the face tracking frame at the time of the start of the zoom-in operation with respect to the reference subject size.

The processes of preventing a subject from falling outside of a frame have been described when the subject is an object in FIG. 3 and when the subject is a person in FIGS. 4A to 4C. The processes of fitting the ratio of the size of the subject image to the screen within the predetermined ranges have been described when the subject is a person in FIGS. 5A and 5B. Even when a tracking target subject is an object, zoom operation start determination may be performed to control maintenance of the size of the subject image illustrated in FIGS. 5A and 5B as in the case in which the subject is a person. When the composition setting is a setting other than "manual," a zoom operation is automatically performed according to each reference size as in FIGS. 5A and 5B.

Figure 7:
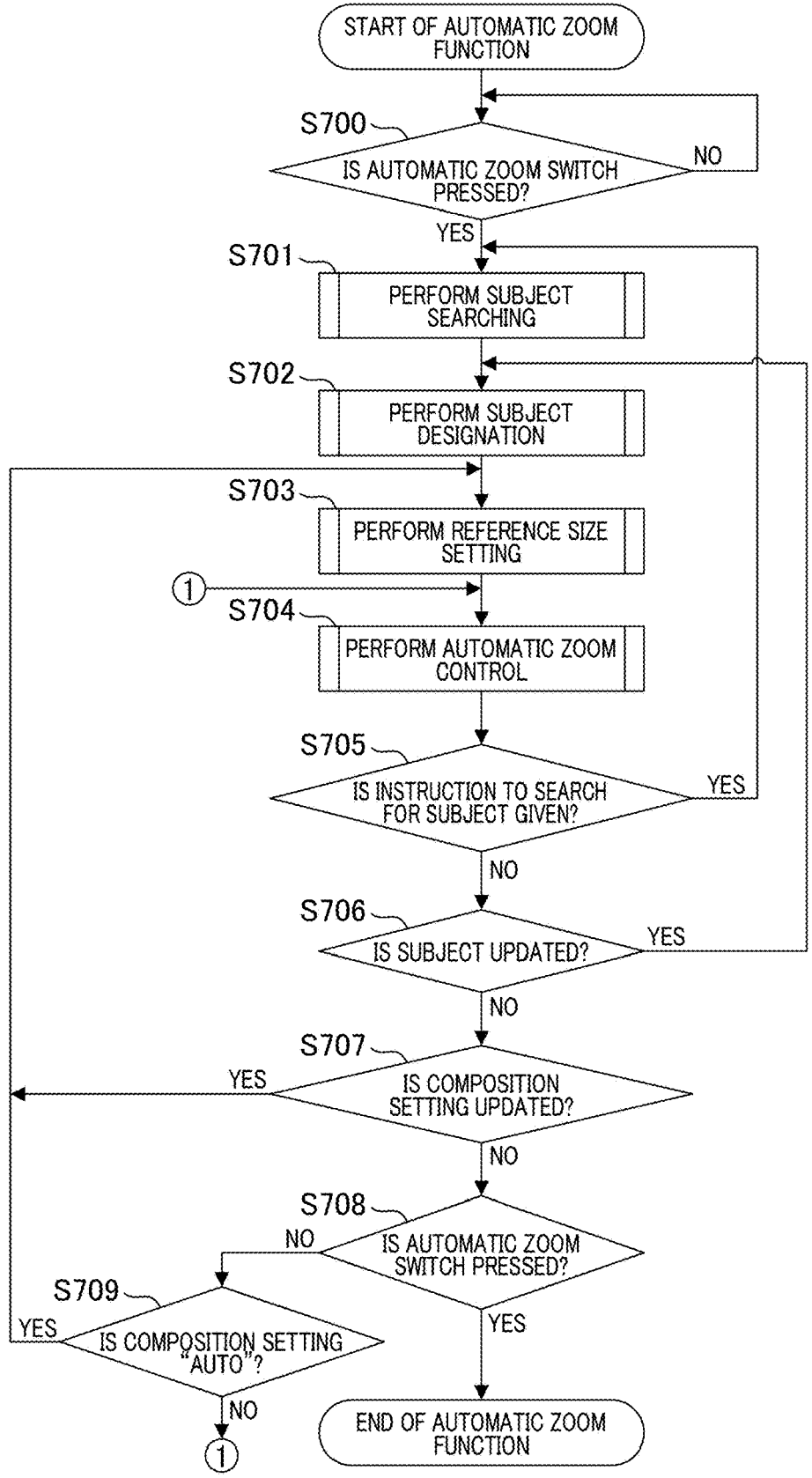
FIG. 7 is a flowchart for describing the flow of a process for an automatic zoom function.
Figure 8:
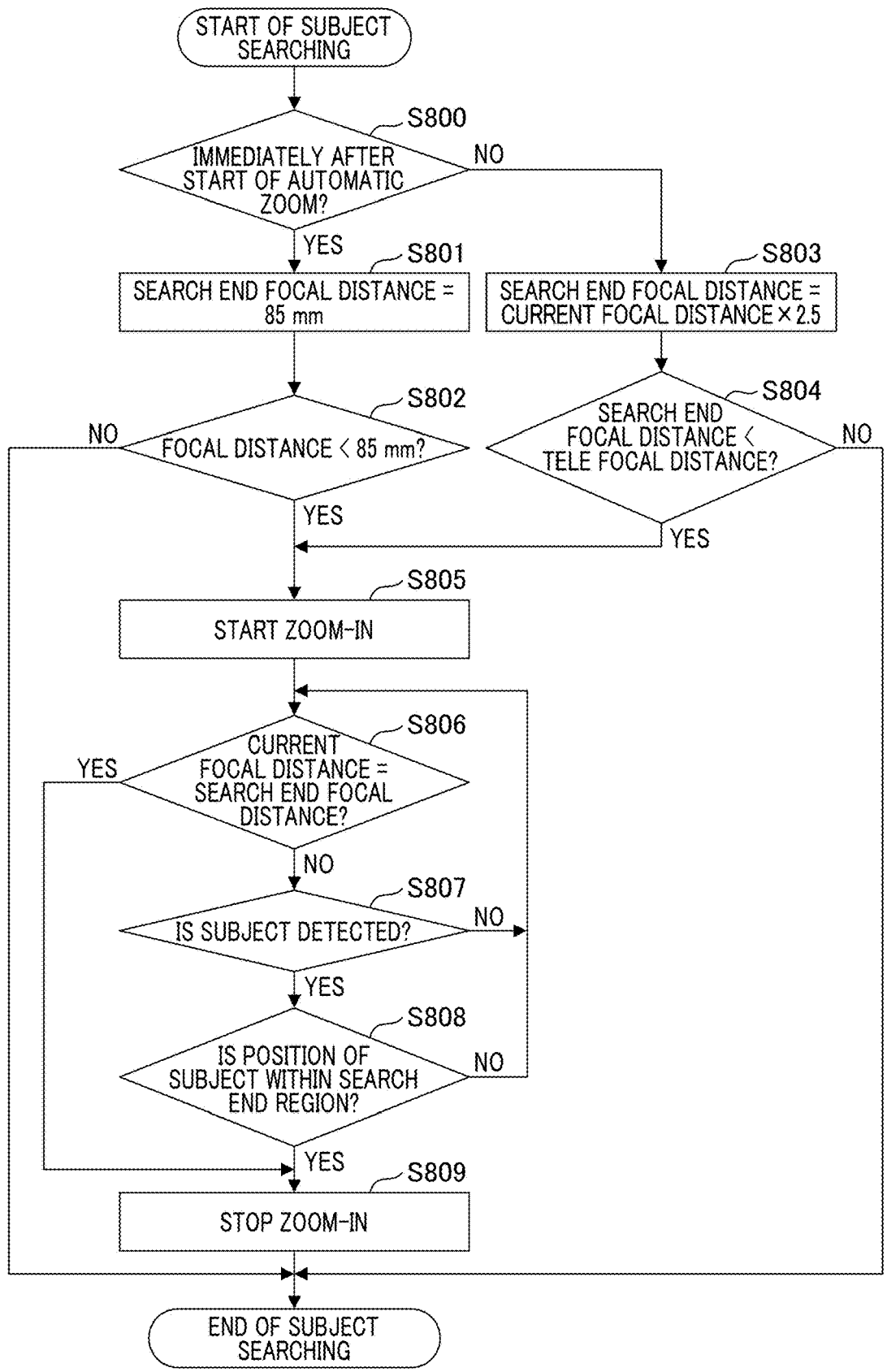
FIG. 8 is a flowchart for describing a subject searching process.

Next, a process for the automatic zoom function will be described with reference to FIGS. 7 to 27. FIG. 7 is a flowchart illustrating an entire processing example of the automatic zoom function. Hereinafter, the automatic zoom function is assumed to be performed based on an instruction of the system control unit 114 (the AZ control unit 122) unless explicitly mentioned otherwise.

In S700, the AZ control unit 122 first determines a manipulation state of the automatic zoom manipulation switch of the manipulation unit 117. When the automatic zoom manipulation switch is pressed, the process proceeds to S701. When the automatic zoom manipulation switch is not pressed, the determination process of S700 is repeated. In S701, a subject searching process is performed. A subject designation process of S702, a reference size setting process of S703, and automatic zoom control of S704 are further performed in order.

Immediately after the process of the automatic zoom function starts or when a subject search button of the manipulation unit 117 is pressed (yes in S705), the subject searching process of S701 is performed. The subject searching process performed in step S701 in control of a zoom magnification will be described with reference to FIG. 8. When a photographing target subject is far away from the camera, even though a subject image is in the screen, there is a possibility of the subject being undetectable by the subject detection unit 123 when a feature region of the subject is too small. In such a scene, the automatic zoom function based on subject information may not be performed. Accordingly, a subject searching process of performing a zoom-in operation while detecting a subject up to a predetermined focal distance is performed.

In S800, a process of determining whether the subject search button is pressed immediately after start of automatic zoom or during the automatic zoom rather than immediately after the start of the automatic zoom is performed. In the case of the former positive determination result (yes) in S800, the process proceeds to S801. In the case of the negative determination result (no), the process proceeds to S803. In S801, a process of acquiring a subject search end focal distance is performed. The subject search end focal distance is a focal distance at an end zoom magnification when the searching of the subject image in the image ends. Hereinafter, the subject search end focal distance is referred to as a search end focal distance. In the embodiment, the search end focal distance is set to a focal distance of 85 mm by 35 mm size conversion immediately after the start of the automatic zoom. The focal distance is a focal distance of a standard lens generally considered to be appropriate when a person is photographed. Even when there is no subject (person) or a face is undetectable (for example, a person is facing backward), the subject detection can be set to a standby state at an appropriate angle of view after the end of the searching. Here, the focal distance is not limited to 85 mm. Another focal distance (for example, 50 mm or 100 mm) corresponding to a predetermined (fixed) zoom magnification may be used irrespective of the zoom magnification at a current time. The photographer may change the search end focal distance from the menu setting or can change the search end focal distance according to a photographing mode, a subject to be photographed, or the like. When the process proceeds from S801 to S802, the focal distance at the time of mode start is compared to the search end focal distance and it is determined whether the focal distance is on a wide angle side or a telephoto side from the search end focal distance. When the focal distance at the time of the start of the automatic zoom is on the telephoto side from the search end focal distance (no in S802), the subject searching process ends. Conversely, when the focal distance at the time of the start of the automatic zoom is on the wide angle side from the search end focal distance (yes in S802), the process proceeds to S805.

Conversely, when it is determined in S800 that the subject is searched for through a manipulation of the subject search button, a process of acquiring the search end focal distance is performed in S803. In the embodiment, the search end focal distance in the manipulation of the subject search button is assumed to be a focal distance on the telephoto side 2.5 times the focal distance when the manipulation is performed. Here, this magnification is merely an example, and another magnification may be used. The photographer may change the search end focal distance from the menu setting or can change the search end focal distance according to a photographing mode, a subject to be photographed, or the like. The process proceeds from S803 to S804, the search end focal distance acquired in S803 is compared to the focal distance at a tele end (telephoto end), and it is determined whether the search end focal distance is on the wide angle side or the telephoto side from the focal distance at the tele end. When the search end focal distance is on the telephoto side from the focal distance at the tele end, the subject searching process ends. When the search end focal distance is on the wide angle side from the focal distance at the tele end, the process proceeds to S805. In S805, the AZ control unit 122 sets a zoom change amount corresponding to the search end focal distance acquired in S801 or S803 in the CZ control unit 119 or the electronic zoom control unit 120 and instructs to perform the zoom-in operation.

Next, in S806, it is determined whether the current focal distance reaches the search end focal distance. When the current focal distance reaches the search end focal distance, the process proceeds to S809. After the zoom-in operation stops, the subject searching process ends. Conversely, when it is determined in S806 that the current focal distance does not reach the search end focal distance, the process proceeds to S807. S807 is a process of determining whether a subject is detected by the subject detection unit 123. When it is determined in S807 that the subject is detected, the process proceeds to S808. When it is determined that no subject is detected, the process returns to S806. In S808, it is determined whether a detection position of the subject is within a predetermined search end region of the screen. The predetermined search end region is assumed to be decided in accordance with a threshold value (position determination reference value) set in advance according to a subject. When the detection position of the subject detected in S807 is within the predetermined search end region on the screen, the process proceeds to S809, the zoom-in operation stops, and the subject searching process ends. Conversely, when it is determined in S808 that the detection position of the subject is not within the predetermined search end region on the screen, the process returns to S806 and the determination processes from S806 to S808 continue.

Figure 9A:
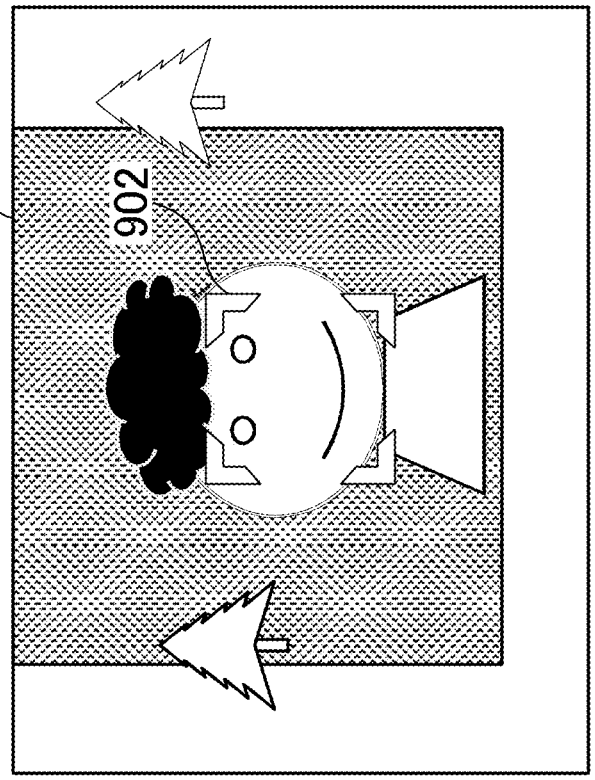
FIGS. 9A and 9B are diagrams for describing a search end region of the subject searching process.
Figure 9B:
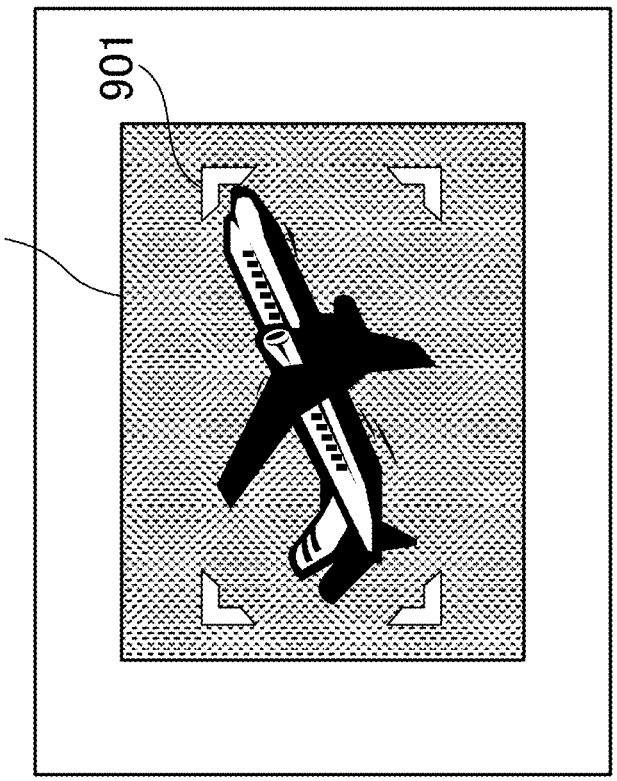

Here, the predetermined search end region described in S808 will be described with reference to FIGS. 9A and 9B. When a specific subject (a person or an object) is photographed, the subject which is a photographing target is disposed near the center of the screen in some cases. When a subject which is not the photographing target is detected in the periphery of the screen and the subject searching process ends, there is a possibility of the subject searching process ending before the subject which is the photographing target is detected. In this case, the automatic zoom function may not be performed according to the photographer's intention. Accordingly, in the embodiment, only when a subject is detected in a central region of the screen which is a specific region and within a region near this region, is the search end region set as a region for determination so that the subject searching process ends. In FIG. 9A, a search end region 900a set when the subject is an object (airplane) is exemplified. When the subject is an object, a range of a predetermined ratio, for example, 70%, from the center of the screen in any of upward, downward, right, and left directions on the screen is set as the search end region of the subject. In FIG. 9B, on the other hand, a search end region 900b set when the subject is a person is exemplified. When the subject is a person, the search end region is set so that a range of 100% from the center of the screen in a region of an upper portion of the screen is included and a range of a predetermined ratio, for example, 70%, from the center of the screen in another direction (right, left, or down) is included. When the subject is a person, there is a possibility of a face tracking frame 902 of a subject which is a photographing target being disposed in the upper portion of the screen. For this reason, even when a subject is detected in the upper portion of the screen, the search end region is set so that the subject searching process ends.

Next, the subject designation process indicated in step S702 in FIG. 7 will be described with reference to FIGS. 10A and 10B. FIG. 10A is a flowchart illustrating an example of a process in which a user designates a desired subject using the touch panel included in the manipulation unit 117. In this example, the user is assumed to perform a designating manipulation by touching a subject image displayed on the display unit 109. In S1000, the AZ control unit 122 determines whether the touch panel is pressed. When the touch panel is pressed, the process proceeds to S1001. When the touch panel is not pressed, the determination process of S1000 is repeated.

In S1001, the AZ control unit 122 acquires information regarding a position (touch position) touched by the user. Subsequently, in S1002, the AZ control unit 122 notifies the subject detection unit 123 of the touch position and the subject detection unit 123 performs face detection near the touch position. When the face is detected near the touch position in S1002, a main subject is determined to be a person and the process proceeds to S1003. Conversely, when the face is not detected near the touch position in S1002, the main subject is determined to be an object other than a person and the process proceeds to S1004.

In S1003, the AZ control unit 122 performs control such that face information of the person who is an automatic tracking target is stored in the memory 118. As the specific face information, there is information regarding a size of the face, a detection position of the face, a direction of the face, or the like when the subject is designated. In a camera having a face authentication function, identification information such as an authentication ID is also stored in the memory 118. In S1004, the AZ control unit 122 performs control such that a feature color near the touch position is stored as color information of the automatic tracking target in the memory 118. As the specific color information, there is information regarding a feature color and its luminance, a chromatic value or a size of a same-color region, the central position of the same-color region, or the like at the time of the subject designation. In the camera having the object authentication function, identification information such as an authentication ID is also stored in the memory 118. In the following description, the face information and the color information are collectively referred to as subject information (including a subject size and a subject detection position).

After the subject information is stored in the memory 118 in S1003 or S1004, the process proceeds to S1005 and the subject tracking frame is displayed. In S1005, the AZ control unit 122 performs control such that the subject detection position is set as a center and a subject tracking frame (an object tracking frame or a face tracking frame) with a size corresponding to the subject size is displayed on the display unit 109. Thereafter, the subject designation process ends.

In this way, the subject detection unit 123 in the system control unit 114 detects a subject at a position designated on the display unit 109 by the photographer or near the designated position. Then, the AZ control unit 122 causes the display unit 109 to display the subject tracking frame. According to the example of the process of FIG. 10A, the subject that the photographer desires to track can be designated simply according to an intuitive method. However, the subject designation method is not limited to this method. Another method will be described with reference to FIG. 10B.

Figure 10B:
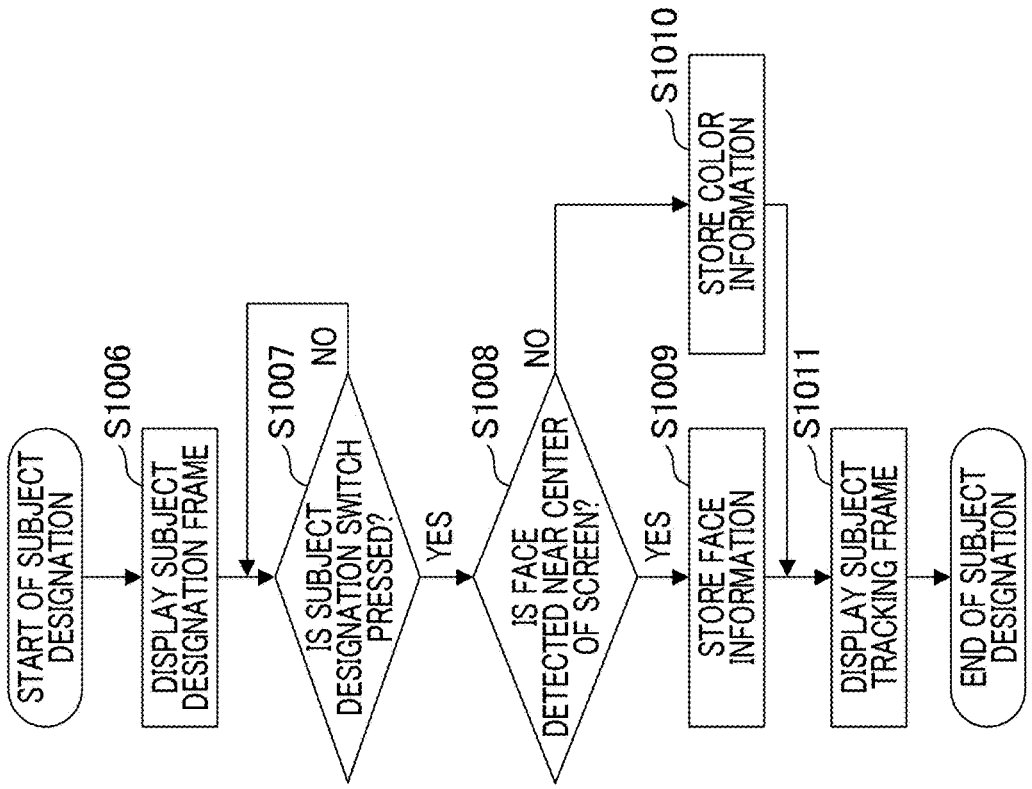
FIGS. 10A and 10B are flowcharts for describing a subject designation process.
Figure 10A:
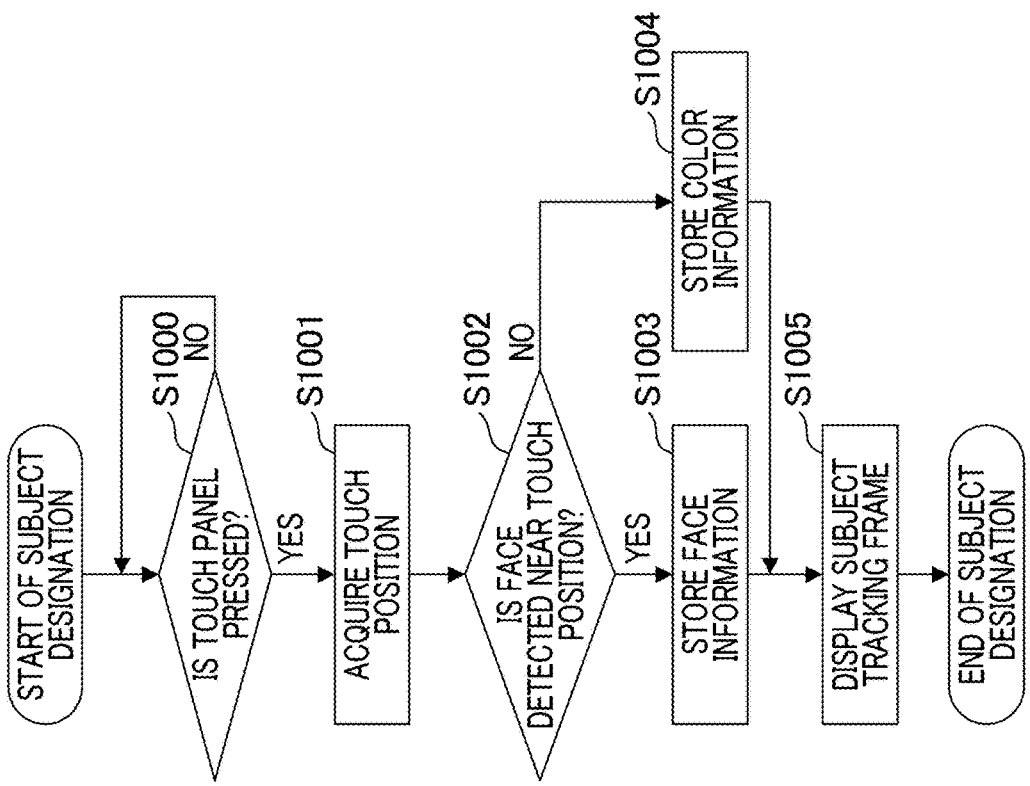

FIG. 10B is a flowchart illustrating an example of a process when the user designates a subject using a different switch (subject designation switch) from the automatic manipulation switch as a manipulation member included in the manipulation unit 117. In S1006, the AZ control unit 122 first displays a frame serving as a reference of the subject destination near the center of the screen of the display unit 109. The photographer adjusts the direction of the camera so that an image of a subject that he or she desires to track using the frame as the reference is fitted near the center of the screen. Next, in S1007, the AZ control unit 122 determines whether the subject designation switch is pressed. When the subject designation switch is pressed, the process proceeds to S1008. When the subject destination switch is not pressed, the determination process of S1007 is repeated in a standby state.

In S1008, the subject detection unit 123 performs the face detection near the center of the screen. When the face is detected near the center of the screen, a main subject is determined to be a person and the process proceeds to S1009. Conversely, when the face is not detected near the center of the screen, the main subject is determined to be an object other than a person and the process proceeds to step S1010. Since the same process as S1003 of FIG. 10A is performed in S1009 and the same process as S1004 of FIG. 10A is performed in S1010, the description thereof will be omitted. After the subject information is stored in the memory 118 in S1009 or S1010, the process proceeds to S1011. Then, the subject tracking frame (the object tracking frame or the face tracking frame) is displayed and the subject designation process ends.

In this way, in the processing example of FIG. 10B, the subject detection unit 123 detects the subject at the position of the center of the screen or near the position of the center of the screen of the display unit 109. The AZ control unit 122 causes the display unit 109 to display the subject tracking frame indicating the position of the subject. Even in a camera on which a manipulation member such as a touch panel is not mounted, the user can simply designate a subject.

FIG. 11 is a flowchart illustrating an example of a process of automatically selecting a subject to be tracked among faces detected when the automatic zoom manipulation switch included in the manipulation unit 117 is pressed. In S1100, the subject detection unit 123 first performs the face detection on the entire screen to determine whether the face of a person is detected. When the face of only one person is detected on the entire screen, a main subject is determined to be a person and the process proceeds to step S1101. Conversely, when one face is not detected in the screen, the process proceeds to S1105.

In S1101, when the number of people whose faces are detected is one person, the subject detection unit 123 selects the face as a main face. When a plurality of faces are detected, the subject detection unit 123 selects a main face assumed as a subject to be tracked among the faces. As the determination standard for selecting the main face, for example, there is a method of preferentially selecting a face of which a face detection position is located closer to the vicinity of the center of the screen. When a plurality of faces are at substantially the same position, there is a method of selecting a face with a larger size as a main face. When a camera has a face authentication function, there is a method of preferentially setting a face registered for authentication as a main face when the face registered for authentication is present.

The process proceeds to S1101 to S1102. Then, after the AZ control unit 122 stores the face information regarding the main face in the memory 118, the process proceeds to S1103 and the face tracking frame is displayed on the screen. Next, in S1104, the face changing determination is performed. That is, when the plurality of faces are detected, the automatically selected main face is not necessarily the face intended by the photographer. For this reason, the photographer can change the main face. At this time, when the photographer presses a switch (the automatic zoom manipulation switch or the like) of the manipulation unit 117 and designates a desired face, a process of changing the main face to another face that was not selected as the main face among the faces for which the face tracking frame was detected is performed. When the main face is changed in S1104, the process returns to S1102 and the face information to be stored in the memory 118 is updated. In S1103, the face tracking frame is changed to the size and the detection position of the newly selected main face.

Conversely, the process proceeds from S1100 to S1105 when the main subject is determined to be an object other than a person. Then, the AZ control unit 122 performs control such that a feature color near the center of the screen is stored as color information of the automatic tracking target in the memory 118. Next, in S1106, the subject designation process ends after the object tracking frame is displayed on the screen. The basic processes in S1102, S1105, S1103 (S1106) of FIG. 11 are respectively the same as the processes in S1003, S1004, and S1005 of FIG. 10A.

In this way, in the processing example of FIG. 11, the subject detection unit 123 in the system control unit 114 performs the face detection on the entire screen of the display unit 109. When a plurality of faces are detected, the AZ control unit 122 performs control such that the display unit 109 displays a subject tracking frame indicating the position of a first face as a main subject among the plurality of faces. When the subject is changed from the first face to a second face, the AZ control unit 122 performs control such that the display unit 109 displays a subject tracking frame indicating the position of the second face. The photographer can designate the desired subject simply with fewer manipulations.

In the subject designation process, both of the method of FIG. 10A and the method of FIG. 10B may be simultaneously applied when a camera includes both of the touch panel and the subject designation switch included in the manipulation unit 117. After the subject change is determined in S706 illustrated in FIG. 7, the subject can be designated with the method of FIG. 10A or 10B. After the subject searching process of S701, the subject can also be designated with the method of FIG. 11. The subject designation process applied according to a flow of the process may be changed. When the subject designation process (S702 of FIG. 7) ends, the process proceeds to S703 of FIG. 7 to perform a process of setting the size of the tracked subject as a reference size.

Figure 12:
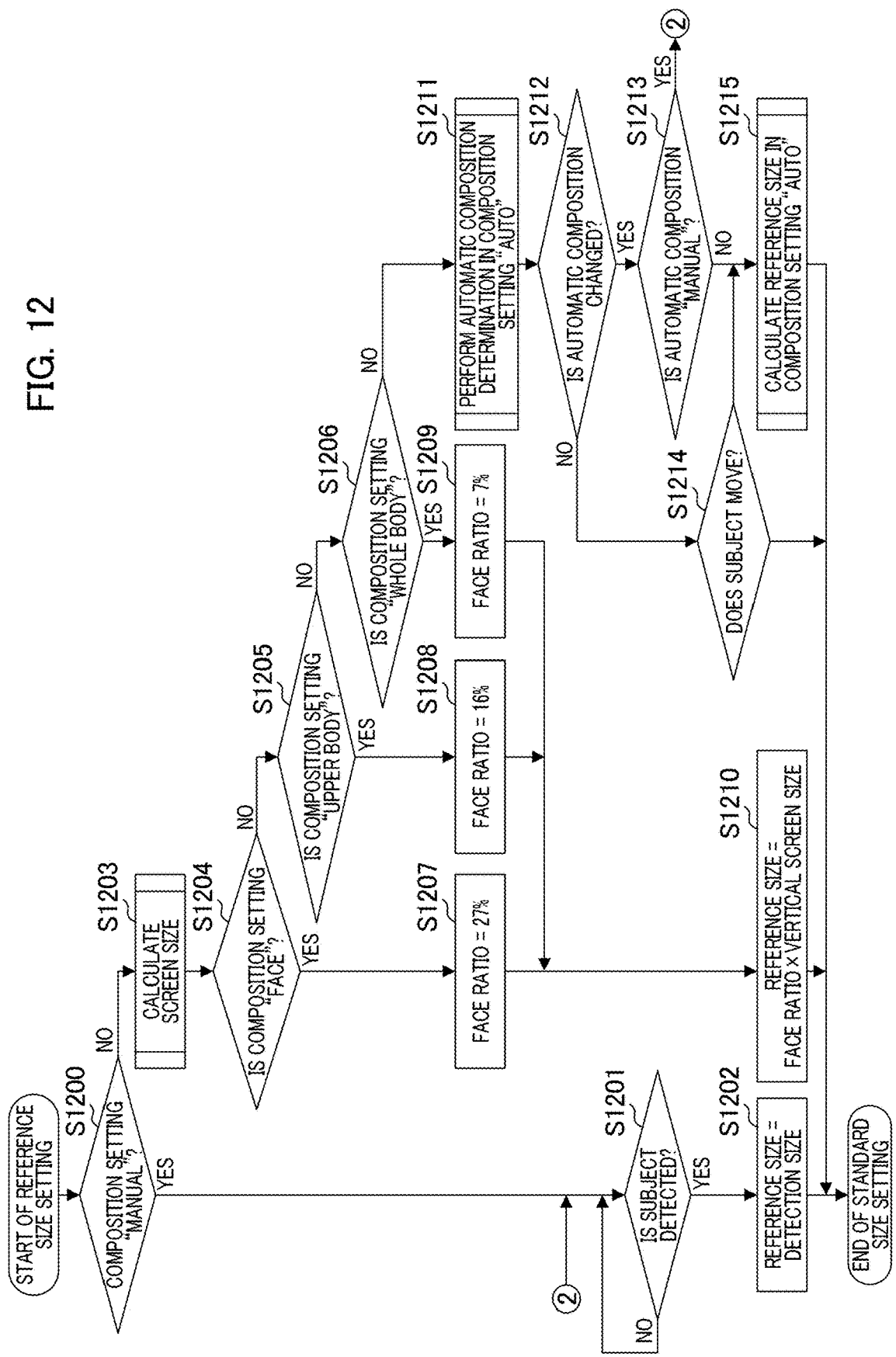
FIG. 12 is a flowchart for describing a reference size setting process.
Figure 13:
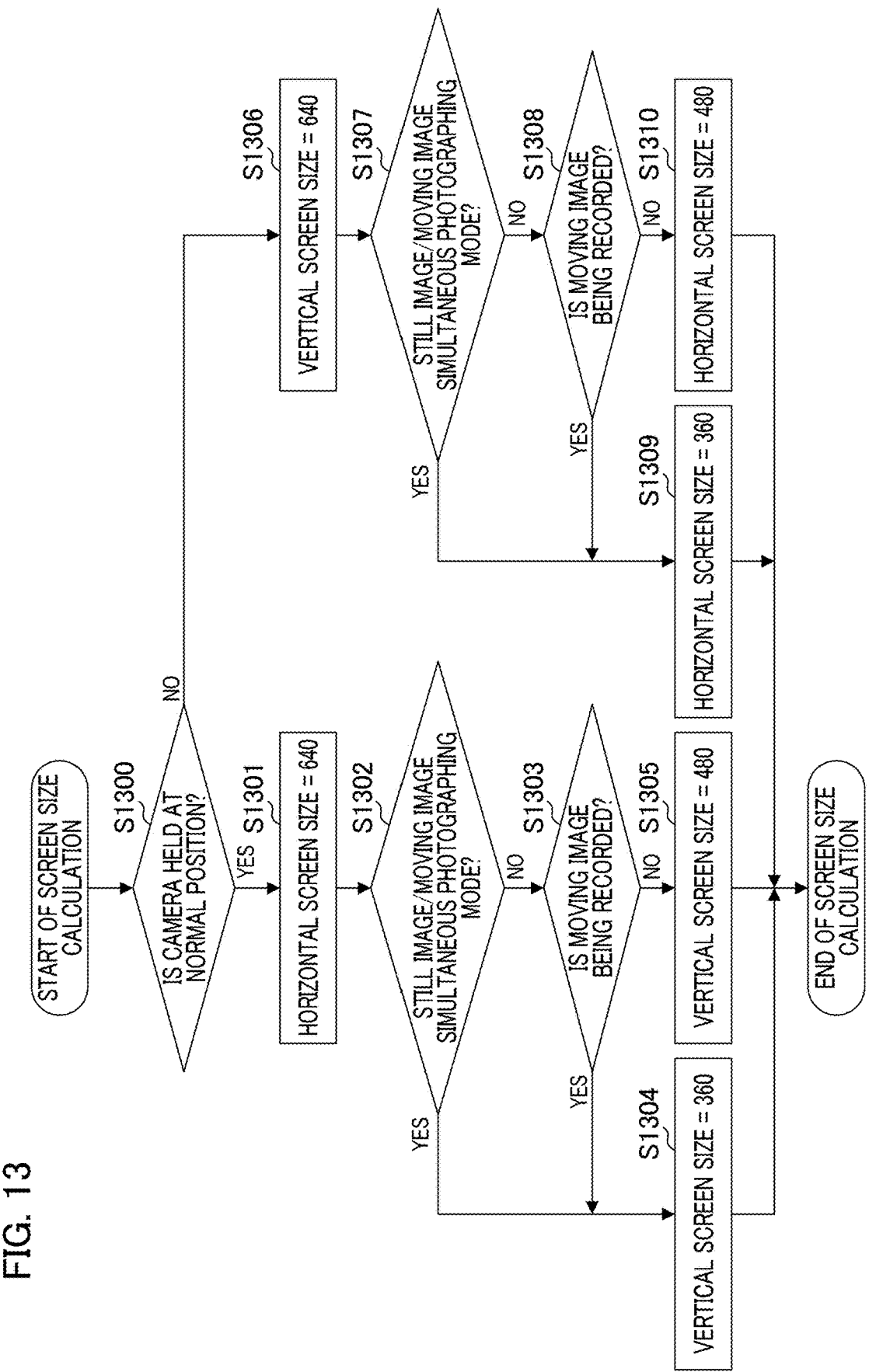
FIG. 13 is a flowchart for describing a screen size calculation process.

The normal reference size setting process of S703 illustrated in FIG. 7 will be described with reference to FIGS. 12 to 19. Further, a reference size setting process when the subject registered in advance is detected and authenticated through the subject authentication process will be described with reference to FIGS. 23 to 27. FIG. 12 is a flowchart illustrating an example of the reference size setting process when a subject is a person. In S1200, the AZ control unit 122 first determines whether the composition setting stored in the memory 118 is "manual" described above. When the composition setting is "manual," the process proceeds to S1201. When the composition setting is not "manual," the process proceeds to S1203.

In S1201, the AZ control unit 122 performs subject detection determination. When the subject detection unit 123 detects that the subject is a person, the AZ control unit 122 determines whether the face is detected. When the subject is an object, the AZ control unit 122 determines whether the same feature color is detected. The determination process of S1201 is repeated until the subject is detected. When the subject is detected, the process proceeds to S1202. In S1202, the AZ control unit 122 sets the size of the detected subject image as a reference size and stores the size in the memory 118. Then, the process ends. Accordingly, when the composition setting is "manual," the size (detection size) of the subject image first detected at the time of starting of the reference size setting process is stored as the reference size in the memory 118.

In S1203, the AZ control unit 122 calculates a screen size based on the posture information of the camera determined by the posture detection unit 124. This screen size is used to calculate a reference size in S1211, S1704, S1705, S1806, and S1807 to be described below. A screen size calculation process will be described with reference to FIG. 13. In the embodiment, a case in which the screen size of a still image is set to "long side×short side=640×480" and the screen size of a moving image is set to "long side×short side=640×360" will be exemplified. However, the screen size is not limited thereto.

In S1300, the posture detection unit 124 determines whether the photographer holds the camera at the normal position or holds the camera at the vertical position. When it is determined that the photographer holds the camera at the normal position, the process proceeds to S1301. When the photographer holds the camera at the vertical position, the process proceeds to S1306. In S1301, a process of setting 640 which is a long side size to the screen size in the horizontal direction is performed. Next, in S1302 a process of determining whether a current set mode is a mode in which a still image and a moving video can be simultaneously photographed (still image/moving image simultaneous photographing mode) is performed. The still image/moving image simultaneous photographing mode is a mode in which the photographer presses the release switch of the manipulation unit 117 during photographing of a moving image to simultaneously perform photographing of a still image or a form of a framing manipulation immediately before photographing of a still image is automatically recorded as a moving image. When it is determined in S1302 that the current set mode is the still image/moving image simultaneous photographing mode, a process of comparing the short side size of the moving image to the short side size of the still image and setting the smaller size as a vertical screen size is performed. This is because a subject is prevented from falling outside of a screen at any angle of view of the still image and the moving image by performing automatic zoom in accordance with the small screen size. Accordingly, in the embodiment, when the current set mode is the still image/moving image simultaneous photographing mode, the process proceeds to S1304 to set 360 which is a short side size of the moving image as the vertical screen size. Thereafter, the screen size calculation process ends.

When it is determined in S1302 that the current set mode is not the image/moving image simultaneous photographing mode, the process proceeds to S1303. In S1303, it is determined whether a moving image is being recorded or a still image is being framed. When it is determined that the moving image is being recorded, the process proceeds to S1304. Conversely, when it is determined that the moving image is not being recorded, the process proceeds to S1305. In S1305, 480 which is a short side size of the still image is set as the vertical screen size.

When it is determined in S1300 that the photographer holds the camera at the vertical position, the process proceeds from S1306 to S1310. The processes from S1306 to S1310 are processes in which the setting of the horizontal screen size and the vertical screen size is switched in the processes from S1301 to S1305. That is, since "horizontal" and "vertical" can be replaced with each other in the above description, the detailed description will be omitted. In the embodiment, the example in which the screen size of a still image is 4:3 (see FIGS. 15A and 15B) and the screen size of a moving image is 16:9 (see FIG. 15C) is described, but the screen size may be changed according to an aspect ratio. A ratio of an image of a person to a screen can be set to be constant irrespective of the aspect ratio. The example in which the screen size differs between the still image and the moving image in the image/moving image simultaneous photographing mode has been described, but a plurality of still images or moving images with different screen sizes may also be photographed simultaneously.

When the screen size is decided in S1203 of FIG. 12, the process proceeds to S1204. When the composition setting stored in the memory 118 is one of "face," "upper body," and "whole body," the AZ control unit 122 decides a ratio (referred to as a face ratio) of the size of a face image to the screen according to the composition setting in S1204 to S1209. The face ratio according to the embodiment is a ratio of the length of the face tracking frame to the screen in the vertical direction, but may be a ratio of the length of the face tracking frame to the screen in the horizontal direction, an area ratio, or the like. Specifically, for example, it is determined in S1204 whether the composition setting is "face." When the composition setting is "face" (yes in S1204), the face ratio is decided as 27% (S1207). When the composition setting is not "face," the process proceeds to S1205 to determine whether the composition setting is "upper body." When the composition setting is "upper body" (yes in S1205), the face ratio is decided as 16% (S1208). When the composition setting is not "upper body," the process proceeds to S1206 to determine whether the composition setting is "whole body." When the composition setting is "whole body" (yes in S1206), the face ratio is decided as 7% (S1209). After the face ratio is decided in the steps from S1204 to S1209, the process proceeds to S1210.

In S1210, the AZ control unit 122 calculates the reference size by multiplying the face ratio decided in S1204 to S1209 by the vertical screen size calculated in S1203. This is a method of calculating the reference size from the face ratio to the screen size in the vertical direction on the presupposition that the subject (person) is standing. When the direction of the face can be determined by the subject detection unit 123, the direction of the screen size may be decided based on the vertical direction of the face on the screen. Further, after the process of storing the calculated reference size in the memory 118 is performed, the reference size setting process ends. Accordingly, when the composition setting is one of "face," "upper body," and "whole body," a size with a predetermined face ratio according to the composition setting to the screen size is set as the reference size.

Figure 22:
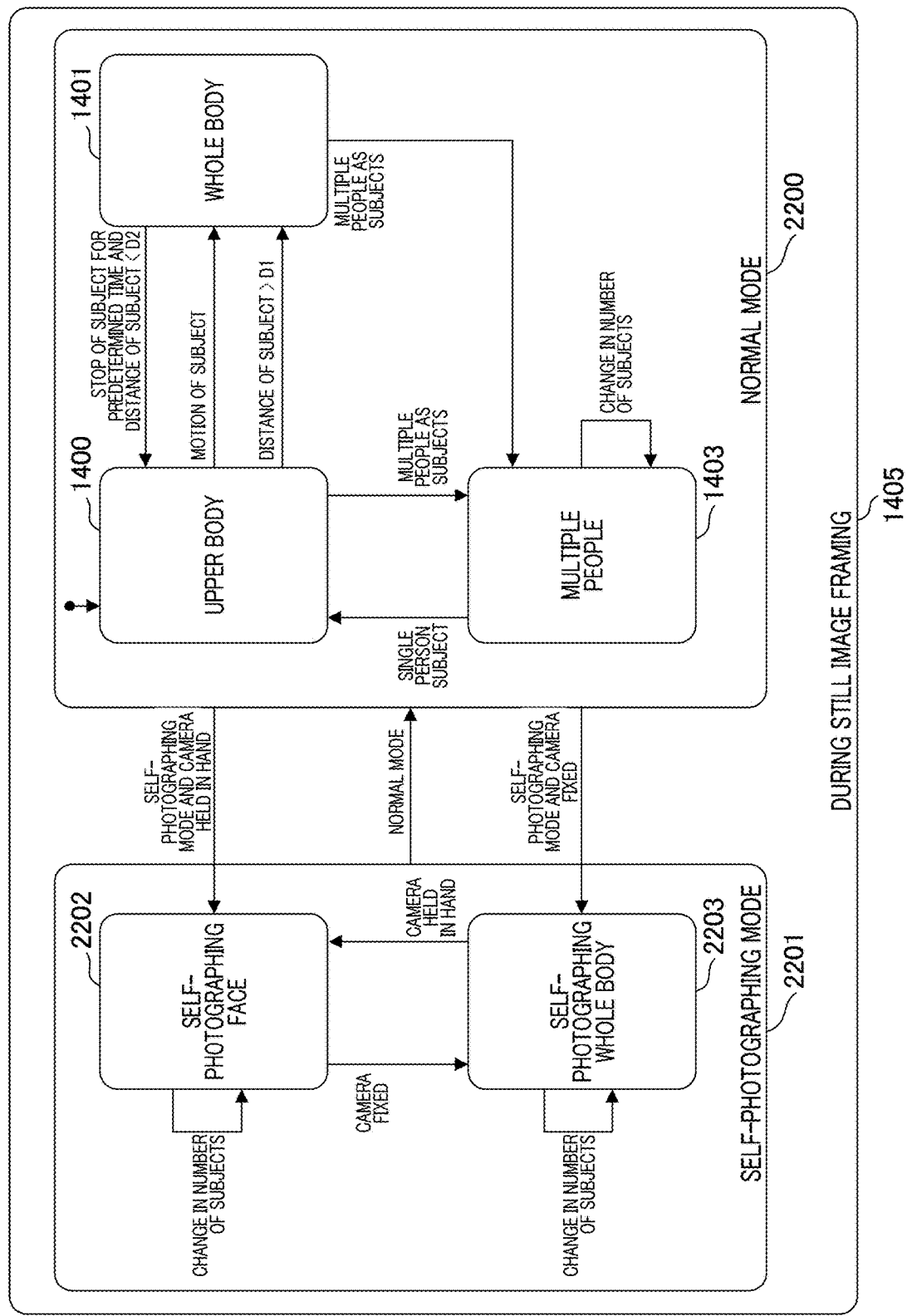
FIG. 22 is a transition diagram for describing automatic composition determination in the composition setting "auto" according to a second embodiment.

When the detected subject is a face registered in advance, a reference size more appropriate for the subject can be calculated by changing a face ratio according to the age of the subject. FIG. 22 illustrates face ratios set according to an age of the subject authenticated through the face authentication process. For the age of the subject, there is a method of using registered age information without change as the attribute of the subject. Further, when the date of birth is registered, the present age of the subject can be calculated based on the date of birth and the present date. In the embodiment, when the detected subject is not authenticated (unregistered face), the same face ratio as a ratio when the subject is a 2-year-old to 12-year-old child is set. When the composition setting is "face," the face ratio is set to 27% irrespective of the age of the subject. When the composition setting is one of "upper body" or "whole body," the face ratio is changed according to the age of the subject. For example, when the age of the subject is a 0-year-old to 1-year-old baby, the face ratio is set to a value greater than a value in the case of the non-authentication. When the subject is an adult (in terms of body shape) of 13 years or older, the face ratio is set to a value less than a value in the case of the non-authentication. Accordingly, when the composition setting is "upper body" or "whole body," an appropriate size can be obtained so that the image size of the subject is not considerably larger or considerably smaller than the screen size.

When the composition setting is not "whole body" in S1206, that is, the composition setting is determined to be "auto," the process proceeds to S1211. Then, the AZ control unit 122 automatically determines an appropriate composition according to a photographing state, the number of subjects, a motion of the subject, or the like. An automatic composition determination and composition selection process in the composition setting of "auto" of S1211 will be described with reference to FIGS. 14 and 24. The composition setting "auto" is a mode in which composition matching can be performed more simply by determining a photographing scene and causing the camera to automatically select an appropriate composition (automatic composition selection).

Figure 14:
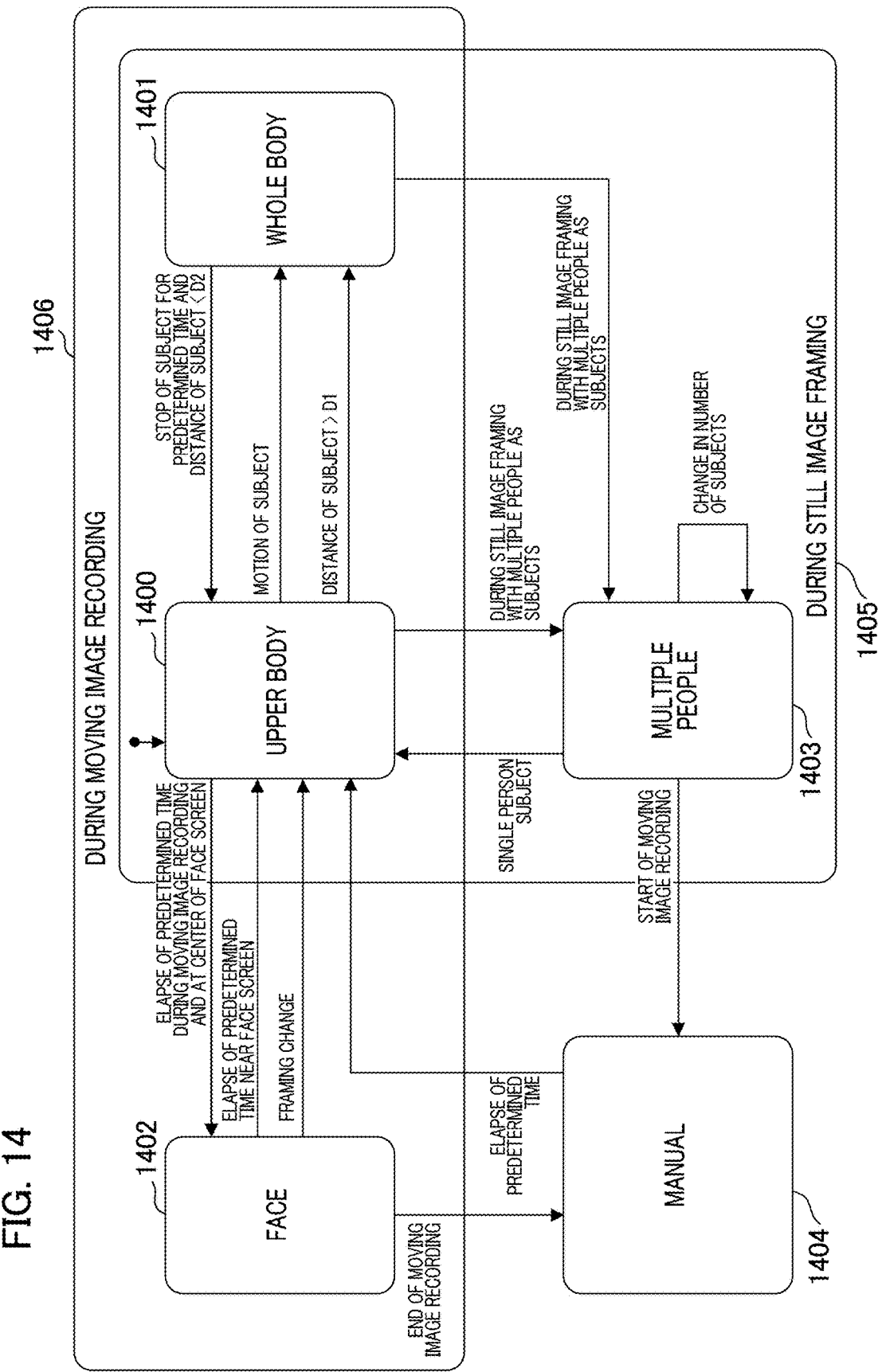
FIG. 14 is a transition diagram for describing automatic composition determination in composition setting "auto."

FIG. 14 is a transition diagram of the composition automatically selected in the embodiment. In the embodiment, a composition selection process of selecting an appropriate composition among five compositions, upper body 1400, whole body 1401, face 1402, multiple people 1403, and manual 1404, according to a photographing scene is performed. In a composition matching manipulation, it is necessary to set a subject image such that the subject image has an appropriate size instantly before photographing when a still image is photographed. On the other hand, when a moving image is photographed, it is necessary to set a subject image such that the subject image normally has an appropriate size during the photographing such as continuous tracking of a subject or approach of a stopped subject. When a moving image is photographed, image data at the time of a zoom-in operation or a zoom-out operation from a change in the composition is recorded. Therefore, a video can be effectively photographed by changing the composition at an appropriate timing. In this way, an appropriate composition differs between a still image and a moving image. Accordingly, a process of changing the selected composition in accordance with a photographing state is performed during still image framing 1405 and during moving image recording 1406. That is, in the embodiment, a photographing preparation state of a still image is exemplified as a first operation state and a recording state of a moving image is exemplified as a second operation state. One composition is selected as the composition of a selection candidate belonging to a first composition group during the still image framing 1405 from upper body 1400, whole body 1401, and multiple people 1403. One composition is selected as the composition of a selection candidate belonging to a second composition group during the moving image recording 1406 from upper body 1400, whole body 1401, and face 1402. That is, the compositions of upper body 1400 and whole body 1401 are common to the first and second composition groups, the composition of multiple people 1403 is included in only the first composition group, and the composition of face 1402 is included in only the second composition group. According to the specification of the imaging apparatus or the like, three or more operation states and a plurality of composition groups (including a composition selectable in each operation state) corresponding to the operation states can be set.

Here, determination conditions of photographing scenes and transition of each composition will be described. When the automatic composition determination process S1211 of the composition setting "auto" starts, upper body 1400 is set as the composition of an initial state. The composition of upper body 1400 is a composition selected when a stopped singular subject is determined to be a photographing scene during the still image framing 1405 or during the moving image recording 1406. In such a scene, a composition of approach to a subject can be appropriately set by setting a composition in which the upper body of the subject is fitted in the screen.

When a motion of a photographing target subject is detected in the composition of upper body 1400 or when a distance between the camera and the subject is determined to be greater than a predetermined distance D1 (first threshold value), the composition is changed to whole body 1401. The composition of whole body 1401 is a composition selected when a scene in which a moving subject or a distant subject, that is, a subject that could easily fall outside of a screen, is photographed is determined during the still image framing 1405 or during the moving image recording 1406. In such a scene, by tracking the subject in the composition in which the whole body of the subject is fitted, the subject is set to fall outside of the screen as little as possible. When it is detected that the photographing target subject stops for a predetermined time or more in the composition of whole body 1401 and it is determined that the distance between the camera and the subject is less than a predetermined distance D2 (second threshold value), a process of returning the composition to upper body 1400 is performed. The predetermined time is a determination standard time set in advance.

Hereinafter, a method of determining a motion or stop of the subject will be described. When at least one of a change amount of position or size of the subject detected by the subject detection unit 123 or a shake amount detected by the shake detection unit 125 in the detection state of the subject is greater than a predetermined amount, the photographing target subject is determined to be moving. When the state in which both of the change amount of position or size of the subject detected by the subject detection unit 123 and the shake amount detected by the shake detection unit 125 in the detection state of the subject are less than the predetermined amount continues for a predetermined time or more, the photographing target subject is determined to be stopped. A time in which the detection state continues is assumed to be measured by a measurement timer.

Further, a method of calculating the distance between the camera and the subject will be described. First, a focal distance serving as a reference and a subject distance in regard to a subject size are measured in advance and measurement data is stored in the memory 118. The subject distance is calculated by performing calculation of "subject distance=(reference subject distance×focal distance×reference subject size)/(reference focal distance×detection size)" in regard to reference values stored in the memory 118. For example, when the reference values are the reference subject distance of 2 m, the reference focal distance of 24 mm, and the reference subject size of 20 pix (pixels), a case in which a subject image with a detection size of 40 pix is detected with a focal distance of 120 mm is assumed. In this case, the subject distance is calculated as "(2 m×120=×20 pix)/(24=× 40 pix)=5 m."

Next, a composition when multiple people are detected as subjects in a screen will be described. When a plurality of people are detected as subjects in a screen in the composition of upper body 1400 or whole body 1401 during the still image framing 1405, a process of changing the composition to multiple people 1403 is performed. The number of subjects detected at this time is stored in the memory 118. The composition of multiple people 1403 is a composition selected when all of the plurality of subjects are determined to be a photographing scene of a group photo fitted at a predetermined angle of view during the still image framing 1405. In the composition state of multiple people 1403, a process of determining whether the number of detected subjects is changed is performed. When the number of detected subjects increases, a new subject enters the screen, the number of subjects stored in the memory 118 is thus updated instantly, and the composition is changed. Conversely, when the number of detected subjects decreases, there is a possibility of a temporarily undetectable state, for example, as in a case in which one subject is oriented horizontally. Therefore, when the composition is instantly changed, there is a possibility of an undetectable subject having fallen outside of the frame. Accordingly, when the number of subjects decreases, it is determined whether this state continues over a predetermined time or more. When this state continues for the predetermined time or more, the number of subjects stored in the memory 118 is updated and the composition is changed. Further, when the number of subjects is one person, a process of returning the composition to upper body 1400 is performed.

When a composition in which all of the subjects are fitted at an angle of view is set during the moving image recording 1406 and a subject other than the photographing target is moving, there is a concern of an erroneous operation of zoom occurring in response to this subject. Accordingly, when a plurality of people are detected as subjects during the moving image recording 1406, a process of setting only a main subject as a photographing target and maintaining upper body 1400 or whole body 1401 as the composition is performed. When a face is detected near the center of the screen over a predetermined time or more in the composition of upper body 1400 during the moving image recording 1406, a process of changing the composition to face 1402 is performed. The composition of face 1402 is a composition selected when a scene in which the photographer is interested in the face of the subject is determined during the moving image recording 1406. In such a scene, the face of the subject of interest can be photographed with a larger size by setting the composition that approaches the face more than the upper body. By changing a zoom speed to a speed considerably lower or higher than a normal speed during a zoom-in operation by the change in the composition, a more effective video can be photographed. Further, when a face is detected near the periphery of a screen over a predetermined time or more in the composition of face 1402 or the photographer is determined to change framing, a process of returning the composition to upper body 1400 is performed. In the embodiment, a periphery region of a screen is exemplified as a specific region, and a continuous time of a state in which the position of a face image of a subject detected by the subject detection unit 123 is the periphery region is measured by a measurement timer. As a method of determining the change of the framing, the photographer is determined to change the framing when the subject detection unit 123 does not detect the subject and the shake amount detected by the shake detection unit 125 is greater than the predetermined amount.

During the still image framing 1405, the photographer sometimes continues to wait to take a picture in the same composition until the direction or expression of the face of a person becomes a desired state. In this case, when the composition of approach to the face is set, there is a possibility of the composition being a different composition from that intended by the photographer. Accordingly, even when the face is detected near the center of the screen for a predetermined time or more in upper body 1400 during the still image framing 1405, a process of maintaining the composition of upper body 1400 is performed.

Next, a composition at the time of the change in a photographing state by start/end of the moving image recording will be described. The compositions of upper body 1400 and whole body 1401 are compositions selectable in both cases during the still image framing 1405 or during the moving image recording 1406. Accordingly, in these compositions, the original composition is maintained even when the photographing state is changed. On the other hand, the compositions of multiple people 1403 and face 1402 are compositions selected only in one case during the still image framing 1405 or during the moving image recording 1406. Accordingly, when the moving image recoding starts in the composition of multiple people 1403 during the still image framing 1405 or the moving image recording ends in the composition of face 1402 during the moving image recording 1406, the change to upper body 1400 which is a common composition is considered. However, in this case, there is a concern of an image being recorded in a zoom state in the beginning of a moving image if the zoom operation starts along with the start or end of the moving image recording, or of the photographer feeling annoyed in the still image framing. Accordingly, when the photographing state is changed in such a state, a process of temporarily changing the composition to manual 1404 is performed. The composition of manual 1404 is a composition in which the size of a main subject image first detected after the change of the composition is set to the reference size. Accordingly, the zoom operation does not immediately start due to the change of the photographing state and the photographer does not feel the sense of discomfort. Even when a subject starts to move, the size of a subject image can be maintained. Further, when a predetermined time has passed in the composition of manual 1404, a process of returning the composition to upper body 1400 is performed.

FIG. 24 illustrates a transition diagram when the subject is authenticated as a registered face. The same reference numerals are given to compositions common to FIG. 14 and the detailed description thereof will be omitted. Compositions of selection candidates during the still image framing 1405 are upper body 1400, whole body 1401, face 1402, and multiple people 1403 and one composition is selected. FIG. 25 illustrates an initial state and a composition change condition of the composition transition according to an age of the subject authenticated in the face authentication process. In the embodiment, when the age of the authenticated subject is less than a predetermined age and a face is detected over a predetermined time in the vicinity of the center of the screen even during the still image framing 1405, a process of changing the composition from upper body 1400 to face 1402 is performed. Specifically, when the subject is a 0-year-old baby and the photographer frames the face in the middle of the screen, the composition of approach to the face is selected. That is, when the subject is determined to be a baby who is relatively still (only 0 years is set as a composition determination condition, unlike the age of a baby in the above-described face ratio setting), the composition is changed so that a still image can be photographed with a close-up on the face. Since the predetermined time of the change of the composition from upper body 1400 to face 1402 is set to be shorter than at other ages, the composition of face 1402 is easily selected.

When the subject is a 1-year-old to 12-year-old child, photographing scenes of moving and playing are assumed to be many and the composition of whole body 1401 is set to be easily selected. Therefore, when the subject is a child, the composition of the initial setting is set to whole body 1401. A determination distance indicating the subject distance D1 or D2 is shorter than in the case of the determination distance for other ages so that upper body 1400 is changed to whole body 1401 even when a distance to the subject is shorter.

As described above, when the composition setting is "auto" in S1211 of FIG. 12, an appropriate composition is automatically determined according to the photographing state, the number of subjects, a motion of the subject, or the like. It is possible to adjust the zoom to a more appropriate angle of view by changing the composition selected according to the age of the subject. Data indicating the composition after the determination is stored in the memory 118 and the process proceeds to S1212.

In S1212, it is determined whether the composition determined in S1211 is changed from the immediately previous composition (whether the composition selected in FIG. 14 transitions or the number of subjects is changed in the state of multiple people 1403). When the composition is changed, the process proceeds to S1213 to determine whether the selected composition is the composition of manual 1404. When the selected composition is the composition of manual 1404, the process proceeds to S1201 to perform a process of storing the size of the first detected subject image as the reference size in the memory 118. When the selected composition is not the composition of manual 1404, the process proceeds to S1215 to calculate the reference size in the composition setting "auto." When it is determined in S1212 that the composition is not changed, the process proceeds to S1214 to determine whether the subject image moves in the screen. As a method of calculating a movement amount of the subject image in the screen, a reference size is set in S1215, and subsequently the central position of the face tracking frame immediately after the zoom operation up to the angle of view for the reference size is stored in the memory 118. A distance from the position stored in the memory 118 to the central position of the detected face tracking frame is calculated as a movement amount. The central position of the face tracking frame may be added during each predetermined period and the movement amount in the screen may be calculated. When the calculated movement amount is equal to or greater than a predetermined amount, the subject is determined to move. By normalizing the predetermined amount with the size of the detected face tracking frame (setting a predetermined multiple of the size of the face tracking frame), a movement amount of an actual subject can be set to be substantially the same irrespective of the size of the subject image in the screen. When it is determined in S1214 that the subject moves in the screen, the process proceeds to S1215 to calculate a reference size in the composition setting "auto." When it is determined in S1214 that the subject does not move in the screen, the reference size setting process ends without updating the reference size.

Hereinafter, the reference size calculation process in the composition setting "auto" will be described with reference to FIGS. 15A to 19. When the composition setting is one of "face," "upper body," and "whole body," the reference size is calculated so that a face has a constant ratio with respect to the screen size in S1210 of FIG. 12. That is, the same reference size is calculated irrespective of the position of the subject image on the screen. Therefore, when the composition is changed so that the subject image increases (is zoomed in on) in a case in which the subject is present in the periphery of the screen, there is a possibility of the subject falling outside of the frame. When the reference size is calculated with this method, it is necessary for the photographer to frame the subject near the center of the screen. Accordingly, this method is not appropriate, for example, when the subject is shifted from the center of the screen and is photographed along with a background. When there are a plurality of subjects, it is necessary to calculate the reference size with another method. Accordingly, when the composition setting is "auto," the size of the subject image is decided based on the composition determined in S1211 and a process of calculating the reference size so that the subject is fitted in the screen irrespective of the position of the detected subject is performed.

Figure 15A:
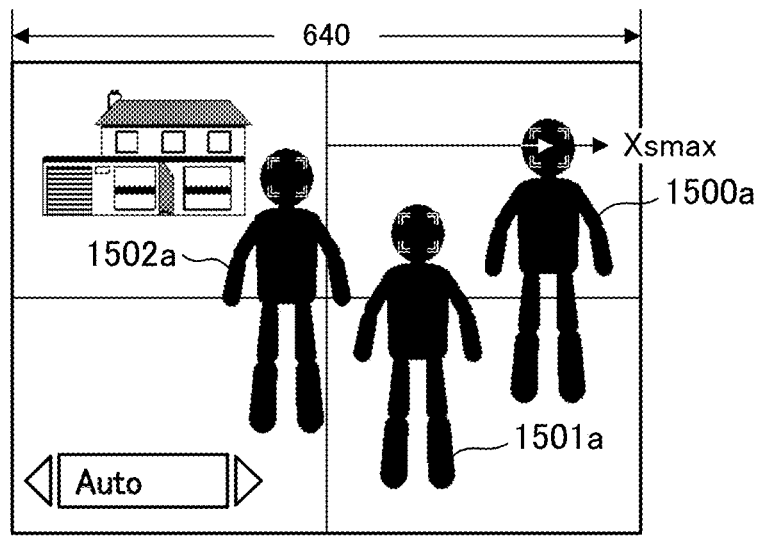
FIGS. 15A to 15C are diagrams illustrating subject positions and screen sizes in the outermost periphery.
Figure 15B:
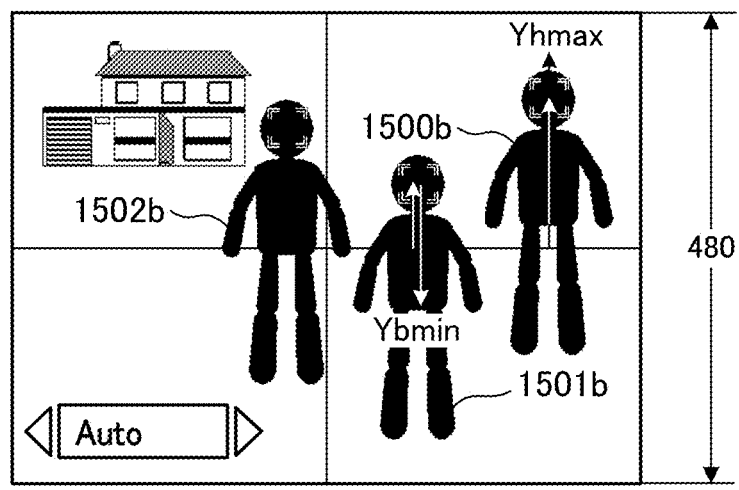
Figure 15C:
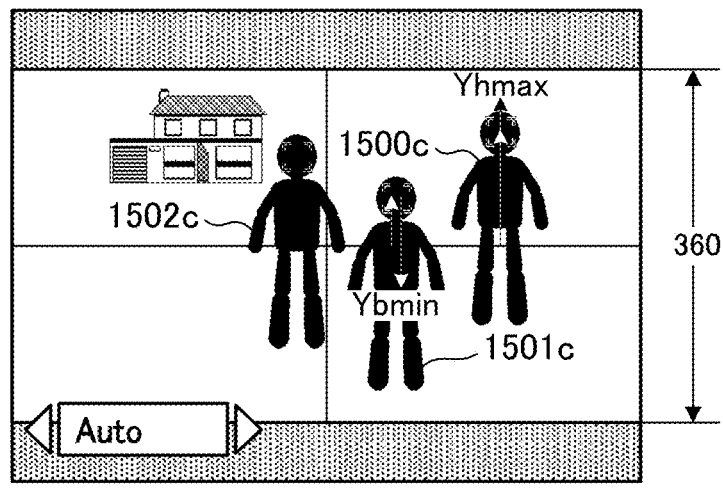
Figure 16:
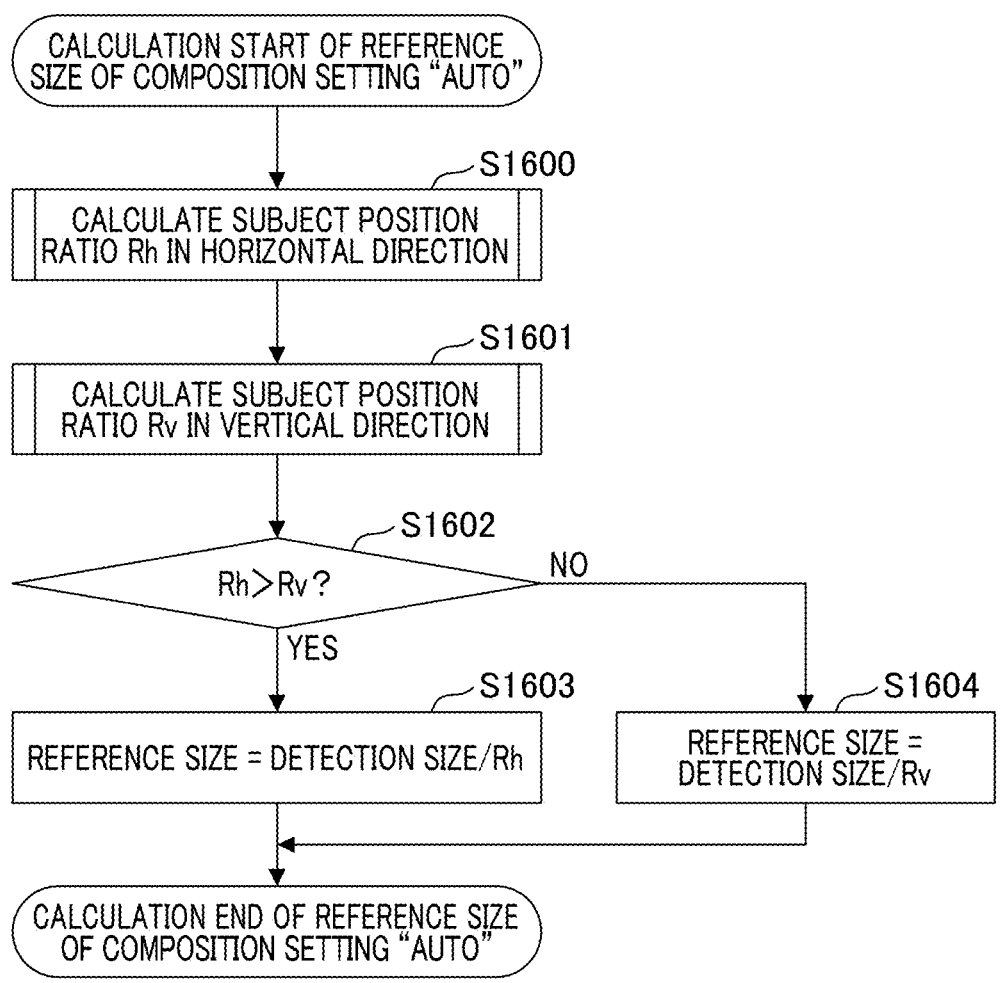
FIG. 16 is a flowchart for describing a process of calculating the reference size in the composition setting "auto."
Figure 17:
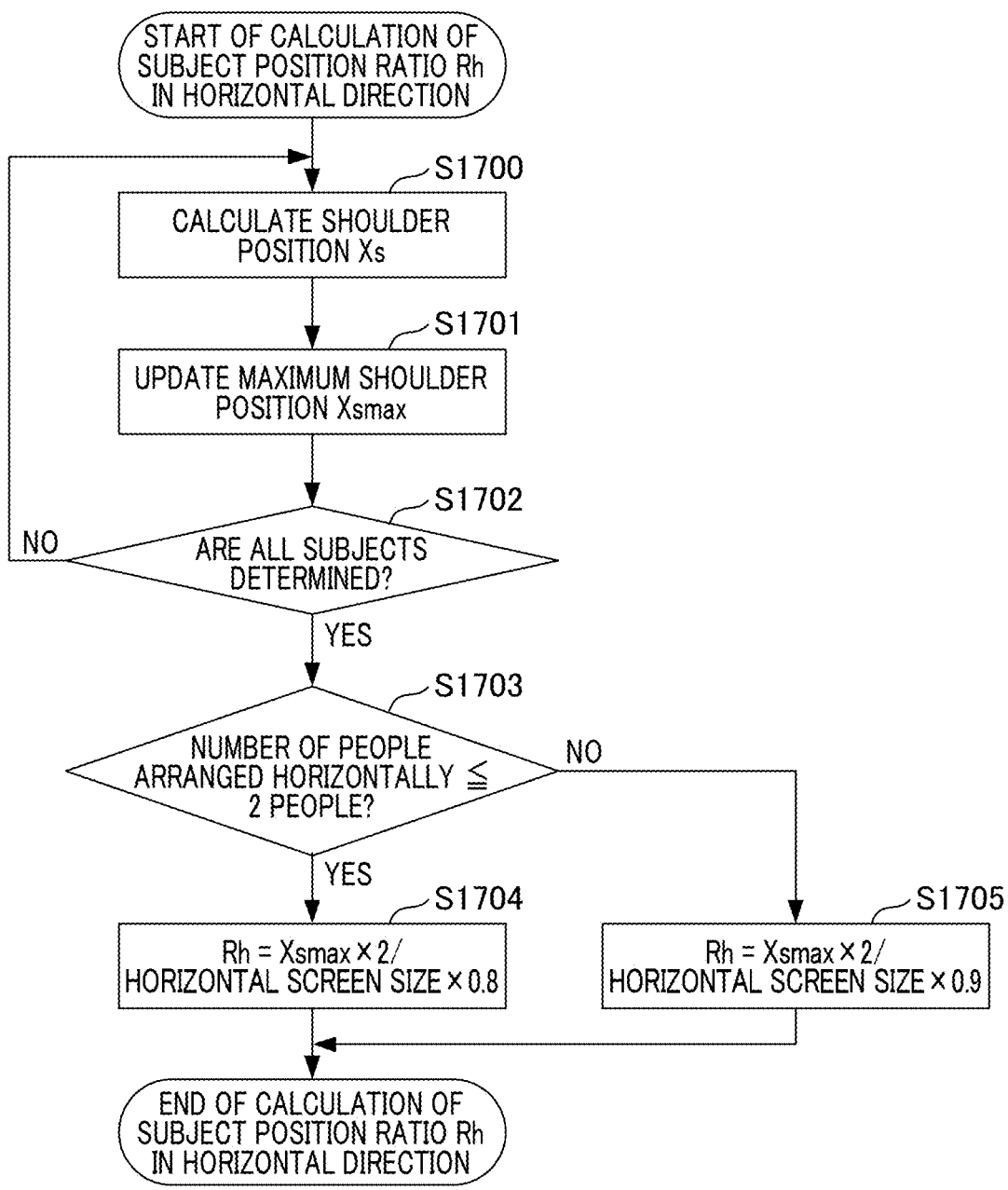
FIG. 17 is a flowchart for describing a process of calculating a subject position ratio in a horizontal direction.

FIGS. 15A to 15C are diagrams illustrating a relation between a screen size and the position of a subject closest to the periphery of the screen among a plurality of subjects. FIGS. 15A and 15B illustrate screen examples of still image photographing and FIG. 15C illustrates a screen example of moving image photographing and exemplifies a plurality of people as subjects. FIG. 16 is a flowchart illustrating an overall process of calculating the reference size in the composition setting "auto."

In S1600 of FIG. 16, a process of calculating a subject position ratio Rh in the horizontal direction is first performed. The subject position ratio Rh in the horizontal direction is a ratio of a distance×2 up to a horizontal position of a shoulder vicinity (hereinafter referred to as a shoulder position and denoted by Xsmax) of a subject closest to a periphery from the center of a screen to a predetermined ratio with respect to a screen size in the horizontal direction. The predetermined ratio is, for example, 80% or 90% of the screen size in the horizontal direction and is changed according to the number of people arranged in the horizontal direction in S1703 to be described below. In FIG. 15A, a subject closest to the periphery from the center of the screen in the horizontal direction is a subject 1500a among subjects 1500a, 1501a, and 1502a. A process of calculating the subject position ratio Rh in the horizontal direction will be described with reference to the flowchart of FIG. 17.

In step S1700, a shoulder position of the subject (denoted by Xs) is calculated based on a central position or size of the face tracking frame of the subject. The center of the screen is assumed to be the origin (0, 0), the central position of the face tracking frame is assumed to be (Xc, Yc), and the size of the face tracking frame is assumed to be S. When Ns is the number of face tracking frames located in a distance from the central position of the face tracking frame to the shoulder position, the shoulder position Xs on the side of the periphery of the screen can be calculated as "$Xs=|Xc|+S\times Ns$". FIG. 19 illustrates a setting example of Ns. A value of Ns is changed according to the composition determined in S1211 of FIG. 12. For example, in the composition of face 1402, Ns=1 (in this case, a horizontal position of the vicinity of an ear rather than the shoulder position) is set. In other cases ("upper body," "whole body," and "multiple people"), Ns=2 is set.

After the shoulder position Xs of the subject is calculated, the process proceeds to S1701. In S1701, the shoulder position Xs calculated in S1700 is stored as the maximum shoulder position Xsmax when the maximum value Xsmax of the shoulder position is not stored in the memory 118. When the maximum shoulder position Xsmax is stored in the memory 118, the shoulder position Xs calculated in S1700 is compared to the maximum shoulder position Xsmax. When the shoulder position Xs is greater than the maximum shoulder position Xsmax, a process of updating the maximum shoulder position Xsmax in the memory 118 to the shoulder position Xs is performed. After the process of updating the maximum shoulder position Xsmax, the process proceeds to S1702. In S1702, it is determined whether a process of calculating the shoulder positions Xs of all the subjects and updating the maximum shoulder positions Xsmax ends. When the calculation of the shoulder position Xs and the updating of the maximum shoulder position Xsmax do not end, the process returns to S1700. When the determination of the maximum shoulder positions Xsmax of all the subjects ends and the updating of the maximum shoulder positions Xsmax ends, the process proceeds to S1703.

In S1703, a process of determining the number of people arranged as subjects in the horizontal direction (the number of people arranged in the horizontal direction) is performed. This is because a composition in which the subjects are fully centered in a screen is set when the number of subjects is larger as in a group photo, and a composition in which a margin remains in the periphery of the screen is set when the number of subjects is small. As a method of counting the number of people arranged in the horizontal direction, when the face tracking frames overlap in the vertical direction (the vertical direction of the screen), the overlapping subjects are counted as one person in total. For example, when four people are detected as subjects in the screen and the face tracking frames of two people among the four people detected as subjects overlap in the vertical direction of the screen, the number of people is counted as three. In S1703, the number of people arranged in the horizontal direction is compared to a threshold value (for example, two people). When the number of people arranged in the horizontal direction is determined to be equal to or less than two, the process proceeds to S1704. When the number of people arranged in the horizontal direction is determined to be equal to or greater than three, the process proceeds to S1705. In S1704 and S1705, each subject position ratio Rh in the horizontal direction is calculated. The subject position ratio Rh in the horizontal direction in S1704 is calculated as a ratio of the maximum shoulder position Xsmaxx2 to 80% of the horizontal screen size. The subject position ratio Rh in the horizontal direction in S1705 is calculated as a ratio of the maximum shoulder position Xsmaxx2 to 90% of the horizontal screen size. After S1704 or S1705, the process of calculating the subject position ratio Rh ends.

Next, a process of calculating the subject position ratio Rv in the vertical direction is performed in S1601 of FIG. 16. The subject position ratio Rv in the vertical direction is a ratio of a distance×2 up to a vertical position of the head of the subject (hereinafter referred to as a head position) or up to a vertical position of a body (hereinafter referred to as a body position) of the subject closest to the periphery from the center of the screen to the predetermined ratio of the screen size in the vertical direction. The predetermined ratio is, for example, 90% of the screen size in the vertical direction. Hereinafter, the head position of the subject closest to the periphery from the center of the screen is denoted by Yhmax and the body position of the subject closest to the periphery from the center of the screen is denoted by Ybmix. Of the subjects 1500b, 1501b, and 1502b in FIG. 15B, a subject whose head is closest to the periphery from the center of the screen in the vertical direction is the subject 1500b, and a subject whose body is closest to the periphery from the center of the screen is the subject 1501b. A process of calculating the subject position ratio Rv in the vertical direction will be described with reference to the flowchart of FIG. 18.

Figure 18:
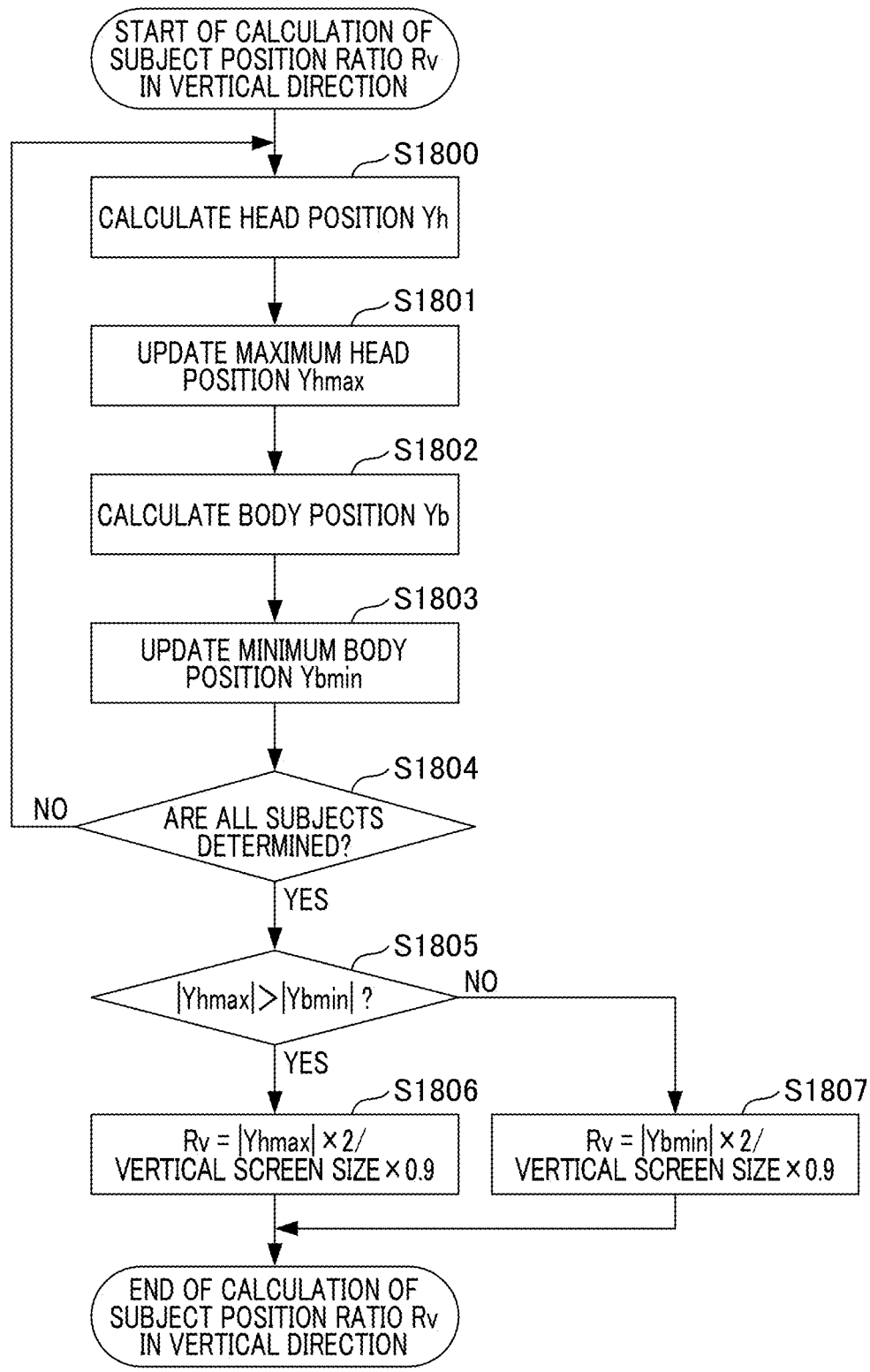
FIG. 18 is a flowchart for describing a process of calculating a subject position ratio in a vertical direction.

In S1800 of FIG. 18, the head position (denoted by Yh) of the subject is calculated based on the central position or size of the face tracking frame of the subject. The head position Yh can be calculated as "Yh=Yc+S×Nh". Nh indicates the number of face tracking frames located in a distance from the central position of the face tracking frame to the head position. A setting example of Nh is illustrated in FIG. 19. For a value of Nh, Nh=1.5 is set irrespective of the composition determined in S1211 of FIG. 12. After the head position Yh of the subject is calculated, the process proceeds to S1801.

In S1801, when a maximum value Yhmax of the head position is not stored in the memory 118, a process of storing the head position Yh calculated in S1800 as a maximum head position Yhmax is performed. When the maximum head position Yhmax is stored in the memory 118, the head position Yh calculated in S1800 is compared to the maximum head position Yhmax. When the head position Yh is greater than the maximum head position Yhmax, a process of updating the maximum head position Yhmax in the memory 118 to the head position Yh is performed. After the updating process, the process proceeds to S1802.

Next, in S1802, a body position (denoted by Yb) of the subject is calculated based on the central position or size of the face tracking frame of the subject. The body position Yb can be calculated as "Yb=Yc−S×Nb". Nb indicates the number of face tracking frames located in a distance from the central position of the face tracking frame to the body position. A setting example of Nb is illustrated in FIGS. 19 and 26. FIG. 26 illustrates a setting example of Nb when the detected subject is a registered face. For example, in the case of the unauthenticated subject and the case of the composition of the face 1402, Nb=1.5 is set. A value of Nb is changed according the composition determined in S1211 of FIG. 12. For example, in the case of the composition of face 1402, Nb=1.5 is set. In the case of the composition of upper body 1400, Nb=5 is set. In the case of the composition of whole body 1401, Nb=10 is set. In the case of the composition of multiple people 1403, Nb=3.5 is set. In this setting, the center of the screen is set at a chest in face 1402, at a part below the waist in upper body 1400, at a leg in whole body 1401, and at a position near a part above the waist in multiple people 1403. When the composition is one of upper body 1400, whole body 1401, and multiple people 1403, the value of Nb is changed in accordance with the age of the subject. In the embodiment, when the detected subject is not authenticated, the same Nb as the 2-year-old to 12-year-old child is set. When the age of the subject is a 0-year-old to 1-year-old baby, Nb is set to a value less than in the unauthenticated case. When the subject is an adult (in terms of body shape) of 13 years or older, Nb is set to a value greater than in the unauthenticated case. Accordingly, when the selected composition is upper body 1400, whole body 1401, multiple people 1403, it is possible to reduce a case in which the subject is considerably larger or considerably smaller than the screen size. After the body position Yb of the subject is calculated, the process proceeds to S1803.

In S1803, when a minimum value Ybmin of the body position is not stored in the memory 118, a process of storing the body position Yb calculated in S1802 as a minimum body position Ybmin is performed. When the minimum body position Ybmin is stored in the memory 118, the body position Yb calculated in S1802 is compared to the minimum body position Ybmin. When the body position Yb is less than the minimum body position Ybmin, a process of updating the minimum body position Ybmin in the memory 118 as the body position Yb is performed. After the updating process, the process proceeds to S1804.

In S1804, the head positions Yh and the body positions Yb of all the subjects are calculated and it is determined whether a process of updating the maximum head position Yhmax and the minimum body position Ybmin ends. When the updating of the maximum head position Yhmax and the minimum body position Ybmin do not end, the process returns to S1800. When the determination of the maximum head positions Yhmax and the minimum body positions Ybmin of all the subjects ends and the updating of the maximum head positions Yhmax and the minimum body positions Ybmin ends, the process proceeds to S1805. In S1805, the absolute value of the maximum head position Yhmax is compared to the absolute value of the minimum body position Ybmin and a process of determining which value is located closer to the periphery of the screen is performed. When it is determined that the maximum head position Yhmax is located closer to the periphery of the screen, the process proceeds to S1806. When it is determined that the minimum body position Ybmin is located closer to the periphery of the screen, the process proceeds to S1807. In S1806 and S1807, each subject position ratio Rv in the vertical direction is calculated. In S1806, the subject position ratio Rv in the vertical direction is calculated as a ratio of the absolute value×2 of the maximum head position Yhmax to 90% of the vertical screen size. In S1807, the subject position ratio Rv in the vertical direction is calculated as a ratio of the absolute value×2 of the minimum body position Ybmin to 90% of the vertical screen size. After S1806 or S1807, the process of calculating the subject position ratio Rv in the vertical direction ends.

Subsequently, in S1602 of FIG. 16, the subject position ratio Rh in the horizontal direction is compared to the subject position ratio Rv in the vertical direction. Accordingly, the position at which the ratio is the largest among the ratios of the distances from the center of the screen to the respective positions of the subject in regard to the predetermined ratio of the screen size in each direction, that is, the position closest to the periphery of the screen, can be determined. The respective positions are the maximum shoulder position Xsmax, the maximum head position Yhmax, and the minimum body position Ybmin. When the subject position ratio Rh in the horizontal direction is determined to be greater than the subject position ratio Rv in the vertical direction, the process proceeds to S1603. When the subject position ratio Rh in the horizontal direction is determined to be equal to or less than the subject position ratio Rv in the vertical direction, the process proceeds to S1604. In S1603 and S1604, a process of calculating the reference size is performed based on the detection size of the main subject and the ratio of the subject position closest to the periphery of the screen determined in S1602. The reference size is calculated as "detection size/subject position ratio Rh in horizontal direction" in S1603 and is calculated as "detection size/subject position ratio Rv in vertical direction" in S1604. That is, in S1603, the zoom operation is performed so that the main subject image has the reference size obtained by multiplying the size of the main subject image by "1/subject position ratio Rh in horizontal direction". In S1604, the zoom operation is performed so that the main subject image has the reference size obtained by multiplying the size of the main subject image by "1/subject position ratio Rv in vertical direction". In this way, the subject can be set at the angle of view based on the composition determined in S1211 without the subject falling outside of the screen.

When the composition setting is "auto" in S1215 of FIG. 12, the subject position closest to the screen periphery in the horizontal direction and the vertical direction is determined based on the composition determined in S1211 and the reference size is calculated so that this subject position is fitted in the screen. Accordingly, regardless of a position on the screen at which the subject image is located, the subject can be fitted at an appropriate angle of view without falling outside of the frame. Whether the number of subjects is singular or plural, the reference size can be calculated through the same process. In the embodiment, the direction of the screen size by which the reference size is calculated has been decided on the presupposition that the person serving as a subject is standing. The invention is not limited thereto. As long as the subject detection unit 123 can determine the direction of the face, the direction of the screen size may be decided based on the vertical direction of the face on the screen. Further, the composition determination or the calculation example of the reference size when the subject is a person has been described, but the invention can also be applied when the subject is an object. However, in this case, compositions to be selected are assumed to be "large," "medium," "small," and "multiple" instead of "face," "upper body," "whole body," and "multiple people." According to the compositions, the number of object tracking frames (corresponding to Ns, Nh, and Nb in the case of a person) when the subject position is calculated may be set. When the subject can be authenticated through the object authentication process, the composition may be changed in accordance with the authenticated subject. For example, as illustrated in FIG. 27, when a subject is a moving object such as an airplane, an electric train, or a bird, a motion of the subject is determined according to the above-described method of determining whether the subject is moving or still. When the subject is determined to be moving, the composition is set to be "small." When the subject is a moving object and the object is determined to be still, the composition is set to "medium." When the subject is a stationary object such as the moon, the composition is set to "large." In this way, even when the subject is an object other than a person, the composition may be changed according to an authentication result.

When the reference size setting process illustrated in FIG. 12 ends, the process proceeds to S704 of FIG. 7. In S704, the AZ control unit 122 performs automatic zoom control based on the subject information detected by the subject detection unit 123 and the reference size stored in the memory 118. The automatic zoom control will be described below with reference to FIG. 20. After the automatic zoom control ends, the process proceeds to S705. Then, the AZ control unit 122 determines whether the photographer gives an instruction to search for a subject. That is, the AZ control unit 122 determines whether the photographer presses the subject search button of the manipulation unit 117. When the subject search button is pressed, the process returns to S701 and the subject searching process is performed. Conversely, when the subject search button is not pressed, the process proceeds to S706. In S706, it is determined whether the automatic zoom target subject is changed through manipulation of the touch panel, a subject designation switch, or the like of the manipulation unit 117. When the subject is changed, the process returns to S702 to perform the subject designation process. Conversely, when the subject is not changed, the process proceeds to S707.

In S707, it is determined whether the composition setting is changed through manipulation of the left and right buttons of the manipulation unit 117 from the photographing screen. When the composition setting is changed, data of the composition setting stored in the memory 118 is updated, and subsequently the process returns to S703 to perform the reference size setting process. Conversely, when the composition setting is not changed, the process proceeds to S708. In S708, it is determined whether the automatic zoom manipulation switch of the manipulation unit 117 is pressed. When the automatic zoom manipulation switch is determined to be pressed, the automatic zoom function ends. Conversely, when the automatic zoom manipulation switch is determined not to be pressed, the process proceeds to step S709. In S709, a process of determining whether the composition setting stored in the memory 118 is "auto" is performed. When the composition setting is "auto," the process returns to S703 to perform the process of setting the reference size including the automatic composition determination. Conversely, when the composition setting is setting other than "auto," the process returns to S704 to continue the automatic zoom control.

Figure 20:
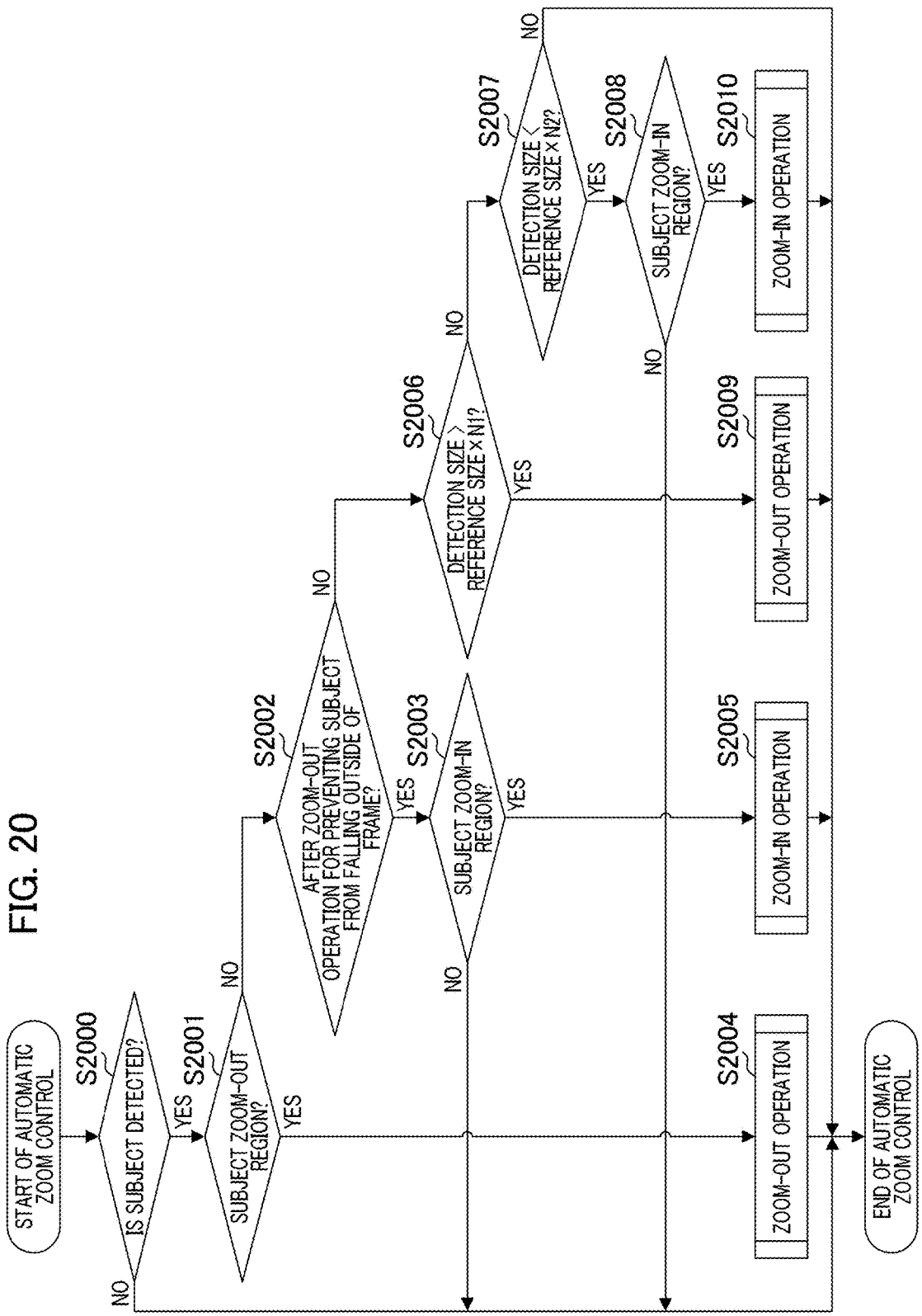
FIG. 20 is a flowchart for describing an automatic zoom control process.

Next, the automatic zoom control process of S704 will be described with reference to the flowchart of FIG. 20. In S2000, the AZ control unit 122 first determines whether the subject detection unit 123 detects the subject. When the subject is not detected in S2000, the automatic zoom control ends. When the subject is detected in S2000, the process proceeds to S2001. The determination of steps from S2001 to S2003 is an automatic zoom start determination process for control of preventing a subject from falling outside of the frame. That is, this process is performed to prevent a subject from falling outside of the screen, as described in FIGS. 3 to 4C. In S2001, the AZ control unit 122 determines whether a subject tracking frame related to a tracking target subject enters a ZO region. This ZO region corresponds to the ZO region described in the left figure of FIG. 3 and FIGS. 4A to 4C. When the subject tracking frame enters the ZO region in S2001, that is, there is a high possibility of the subject falling outside of the frame, the process proceeds to S2004 to start a zoom-out operation. Here, the zoom-out operation corresponds to a zoom-out operation for the control of preventing the subject from falling outside of the frame. After the zoom-out operation, the automatic zoom control ends.

Conversely, when the subject tracking frame does not enter the ZO region in S2001, that is, when the camera captures the subject near the center of the screen, the process proceeds to S2002. In S2002, it is determined whether an immediately previous zoom operation is a zoom-out operation performed because the subject tracking frame entered the ZO region in S2001, that is, whether the immediately previous zoom operation is the zoom-out operation for the control of preventing the subject from falling outside of the frame. When it is determined in S2002 that the operation is performed after the zoom-out operation for the control of preventing the subject from falling outside of the frame, the process proceeds to S2003. Conversely, when it is determined in S2002 that the operation is not performed after the zoom-out operation for the control of preventing the subject from falling outside of the frame, the process proceeds to S2006.

In S2003, the AZ control unit 122 determines whether the subject tracking frame related to the tracking target subject is fitted (included) in a ZI region. Here, this ZI region corresponds to the ZI region described in the right figure of FIG. 3B and FIGS. 4A to 4C. When it is determined in S2003 that the subject tracking frame is not fitted in the ZI region, the automatic zoom control process ends. Conversely, when it is determined that the subject tracking frame is fitted in the ZI region, the process proceeds to S2005. That is, when the camera captures the subjects so that the subject size is within an angle of view near the center of the screen and at a zoom return position, a zoom-in operation starts in S2005. Here, the zoom-in operation corresponds to the zoom-in operation for the control of preventing the subject from falling outside of the frame. After the zoom-in operation, the automatic zoom control ends.

In the embodiment, to cause the control of preventing the subject from falling outside of the frame and the size maintenance control in the automatic zoom to be compatible, the subject is captured near the center of the screen for the control of preventing the subject from falling outside of the frame and the size maintenance control can be performed. Therefore, after the zoom-out operation for the control of preventing the subject from falling outside of the frame, an automatic zoom process (S2006 to S2010 below) of constantly maintaining a subject size to be described below (controlling size maintenance) is not performed. In other words, when the control of preventing the subject from falling outside of the frame is performed, the size maintenance control is not performed until the zoom-in operation for the control of preventing the subject from falling outside of the frame is completed.

Next, processes of S2006 to S2010 will be described. When it is determined in S2002 that the operation is not performed after the zoom-out operation for the control of preventing the subject from falling outside of the frame, the process proceeds to S2006. The AZ control unit 122 compares the detection size of the subject to a size obtained by multiplying the reference size by a predetermined ratio (denoted by N1 where N1>1). The size of the subject indicated by the information regarding the reference subject set in S1202 or S1210 and S1215 of FIG. 12 is compared to the size of the subject detected in S2000. When the size of the subject detected in S2000 is greater than N1 times the size of the reference subject, that is, a ratio of the subject image to the screen exceeds a predetermined value, the process proceeds to S2009. In S2009, the AZ control unit 122 starts a zoom-out operation. Here, this zoom-out operation corresponds to the zoom-out operation for the size maintenance control. After the zoom-out operation, the automatic zoom control ends.

Conversely, when the size of the subject detected in S2000 is equal to or less than N1 times the size of the reference subject in S2006, the process proceeds to S2007. In S2007, the AZ control unit 122 compares the size of the subject of the information regarding the reference subject to the size of the subject detected in S2000. When the size of the detected subject is less than the size of the reference subject at a predetermined ratio (denoted by N2 where N2<1) (less than N2 times), that is, a ratio of the subject image to the screen is less than a predetermined value, the process proceeds to S2008. Conversely, when the size of the detected subject is equal to or greater than N2 times the size of the reference subject, the automatic zoom control ends.

In S2008, the AZ control unit 122 determines whether the subject tracking frame related to the tracking target subject is fitted (included) in a ZI region. This is because the subject is prevented from falling outside of the frame by the zoom-in operation when the subject is in the periphery of the screen. Here, this ZI region corresponds to the ZI region described in the center figure of FIG. 5B. When it is determined in S2008 that the subject tracking frame is not fitted in the ZI region, the automatic zoom control process ends.

Conversely, when it is determined in S2008 that the subject tracking frame is fitted in the ZI region, the process proceeds to S2010. In S2010, the AZ control unit 122 starts a zoom-in operation. Here, this zoom-in operation corresponds to the zoom-in operation for the size maintenance control. In this way, in the embodiment, to prevent the subject from falling outside of the frame even in the zoom-in operation for the size maintenance control, the subject image is fitted in the ZI region and then the zoom-in operation starts. After the zoom-in operation, the automatic zoom control ends.

Figure 21:
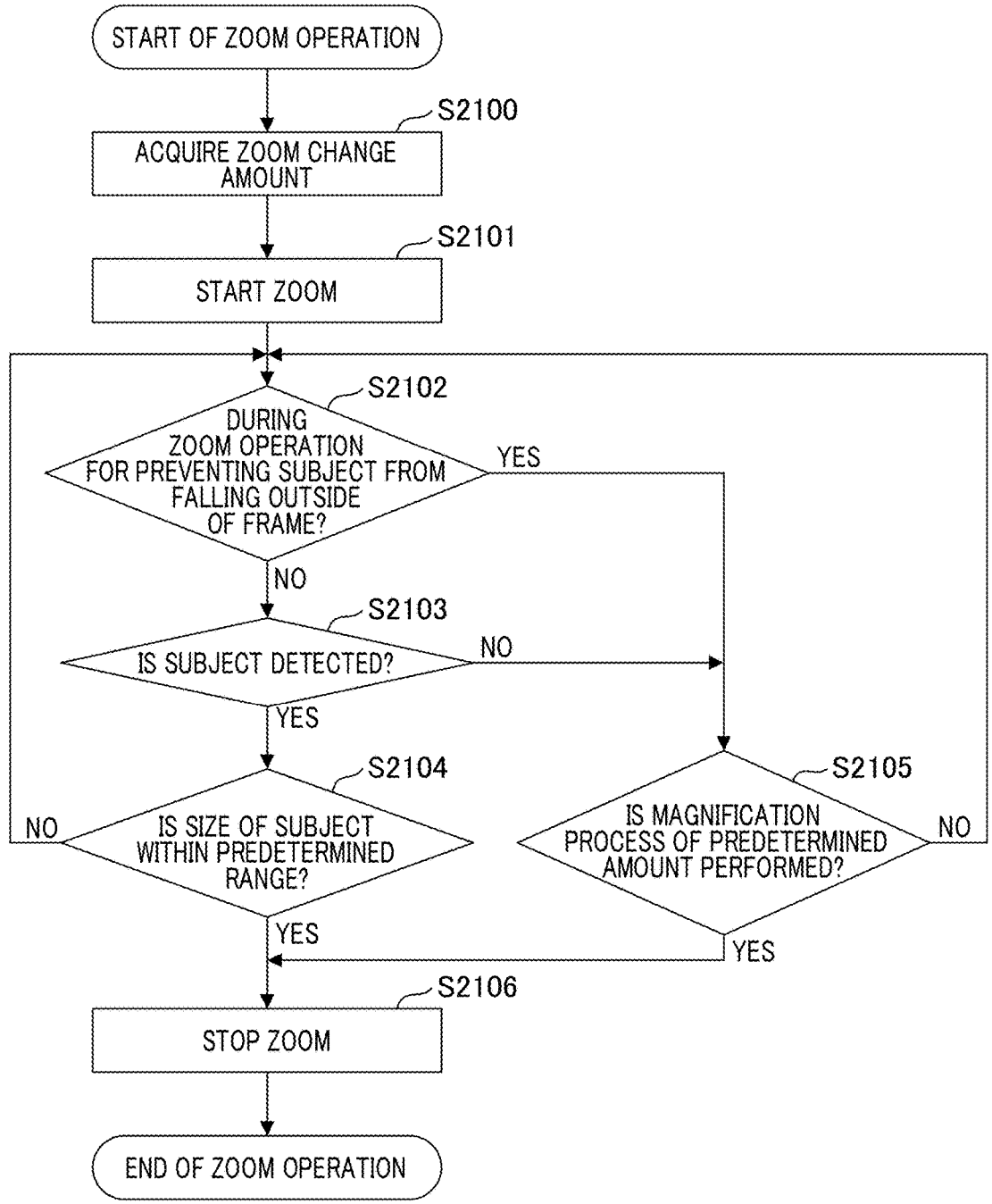
FIG. 21 is a flowchart for describing a zoom operation.

Next, a zoom operation will be described with reference to FIG. 21. FIG. 21 is a flowchart for describing the zoom-out operation or the zoom-in operation in S2004, S2005, S2009, and S2010 of FIG. 20. First, in S2100, the AZ control unit 122 acquires a zoom change amount (a change amount of zoom magnification) from the memory 118. In the case of the zoom-out operation for the control of preventing the subject from falling outside of the frame, a zoom-out change amount is set according to the information regarding the detected subject.

Specifically, in the zoom-out operation for the control of preventing the subject from falling outside of the frame (S2004 of FIG. 20), the zoom-out change amount is set to be smaller as the size of the subject is smaller. Accordingly, it is possible to prevent the subject from becoming too small due to the zoom-out operation and not being detected. In consideration of a detectable minimum size of the subject, the zoom-out operation may not be performed when the size of the subject is less than a predetermined size. In a zoom-in operation for the control of preventing the subject from falling outside of the frame, a zoom magnification before start of the zoom-out operation is stored in the memory 118. A zoom-in change amount is set so that the zoom magnification is the same as the zoom magnification before the start of the zoom-out operation.

In the zoom-out operation for the size maintenance control (S2009 of FIG. 20), a zoom-out change amount (1/N1 times) corresponding to a predetermined N1 times used for the determination of S2006 is set. Accordingly, even when the subject is undetectable, a minimum zoom-out operation can be performed until the size of the subject becomes the size of the reference subject. Similarly, in the zoom-in operation for the size maintenance control (S2010 of FIG. 20), a zoom-in change amount (1/N2 times) corresponding to a predetermined N2 times used for the determination of S2007 is also set.

In S2101, the AZ control unit 122 sets the zoom change amount acquired in S2100 in the CZ control unit 119 or the electronic zoom control unit 120 and gives an instruction to perform a magnification process. Next, in S2102, the AZ control unit 122 determines which zoom operation is being performed between the zoom operations for the control of preventing the subject from falling outside of the frame and for the size maintenance control. When the zoom operation at the current time is the zoom operation for the control of preventing the subject from falling outside of the frame (S2004 and S2005 of FIG. 20), the process proceeds to S2105. Conversely, when the zoom operation at the current time is the zoom operation for the size maintenance control (S2009 and S2010 of FIG. 20), the process proceeds to S2103.

In S2103, the AZ control unit 122 determines whether the subject detection unit 123 detects the subject. When the subject is detected, the process proceeds to S2104. When the subject is not detected, the process proceeds to S2105. In S2104, the size of the subject indicated by the information regarding the reference subject is compared to the size of the subject detected in S2103. When the size of the subject detected in S2103 and the size of the reference subject are determined not to be within a predetermined ratio range (within a predetermined change amount) as the result of the comparison, the process proceeds to S2102 again and the determination of the zoom operation continues. When the size of the subject detected in S2103 and the size of the reference subject are within the predetermined ratio range through the zoom operation, the process proceeds to S2106. In S2106, the AZ control unit 122 stops the zoom operation, and then ends the zoom operation process.

When it is determined in S2102 that the zoom operation is the zoom operation for the control of preventing the subject from falling outside of the frame or the subject is not detected during the zoom operation for the size maintenance control in S2103, the process proceeds to S2105. In S2105, based on the zoom change amount acquired in S2100, the AZ control unit 122 determines whether a magnification process corresponding to the zoom change amount of a predetermined amount according to each zoom operation is performed. When the magnification process of the predetermined zoom change amount is not performed, the process returns to S2102 again to continue the process. Conversely, when the magnification process of the predetermined zoom change amount is performed, the process proceeds to S2106 and the AZ control unit 122 stops the zoom during the operation and ends the zoom operation process.

In the embodiment, a photographing scene is determined in accordance with a motion of a subject, the number of subjects, a detection time of a subject, a distance from a camera to a subject, or the like. The appropriate composition is automatically selected by the camera according to the determined scene. A process of setting the reference size of the subject image is performed based on the composition selected through the composition selection process and a zoom operation is performed so that an image of the detected subject has the reference size. According to the embodiment, the automatic zoom can be performed so that the appropriate composition is selected according to the photographing scene determined based on the detection information of the camera without selection of the composition by the photographer.

In the embodiment, the more appropriate composition is automatically selected by the camera based on the attribute information of the subject in accordance with the authentication result of the subject. The process of setting the reference size of the subject image is performed based on the composition selected through the composition selection process and the zoom operation is performed so that the image of the detected image has the reference size. In particular, by changing the face ratio according to age in the calculation of the reference size of a person, it is possible to perform the zoom operation so that the more appropriate size is set. In the embodiment, the case in which the selection of the composition or the face ratio is changed in accordance with the age of a person has been exemplified, but the invention is not limited thereto. For example, a configuration in which the initial composition or the face ratio is registered for each individual (name) may be realized. The example in which ages are classified into baby (0 years old or 0 to 1 year old), child (12 years old or less), and adult (13 year old or more) has been described. The ages may be set in more detail or the ages may be changed in accordance with sex. In the embodiment, the automatic zoom control can be performed with the composition appropriate for the attribute of the subject determined based on the authentication information of the subject without selecting the composition of the subject.

Second Embodiment

Next, a second embodiment of the invention will be described with reference to FIG. 22. FIG. 22 illustrates an example of the transition diagram of compositions different from FIG. 14 in the automatic composition determination process S1211 of the composition setting "auto" in FIG. 12. The same reference numerals are given to compositions common to FIG. 14 and the detailed description thereof will be omitted.

In the first embodiment, the example in which the photographing scene is determined when a person different from the photographer is photographed as a subject has been described. The mode at that time is referred to as a normal mode for convenience. A camera is directed to a photographer himself or herself to photograph one person or multiple people including the photographer himself or herself as subjects in some cases. A mode appropriate for such photographing is referred to as a self-photographing mode. In the self-photographing mode, by adjusting an angle of view appropriate for the self-photographing through automatic zoom control and applying a background blurring effect, a skin beautification filtering effect, or the like, it is possible to perform effective portrait photographing.

In a composition matching manipulation, it is necessary to set a subject image to an appropriate size according to whether the subject is stopped or moving at the time of the normal mode. On the other hand, in the self-photographing mode, it is necessary to change an appropriate size according to whether a photographer is holding a camera or has put it down even when the subject is stopped. For example, when the photographer is holding the camera to perform photographing, the photographing is performed so that a face is fitted to be large at the angle of view. When the photographer has put the camera down to perform photographing, the photographing is performed so that a whole body is fitted at an angle of view. In this way, an appropriate composition differs between the photographing of the normal mode and the self-photographing mode.

Accordingly, in the embodiment, a process of changing the selected composition between a normal mode 2200 and a self-photographing mode 2201 in FIG. 22 is performed. That is, the normal mode is exemplified as the first mode and the self-photographing mode is exemplified as the second mode. One composition is selected from upper body 1400, whole body 1401, and multiple people 1403 which are compositions of the selection candidates belonging to the first composition group in the normal mode 2200. One composition is selected from self-photographing face 2202 and self-photographing whole body 2203 which are compositions of the selection candidates belonging to the second composition group in the self-photographing mode 2201.

Here, a determination condition of the photographing scene and transition of each composition will be described. When the automatic composition determination process S1211 of the composition setting "auto" starts, upper body 1400 is set as the composition of the initial state. When the mode is the normal mode 2200, the transition is the same as that during the still image framing 1405 of FIG. 14. Therefore, the description thereof will be omitted.

When the mode is changed from the normal mode 2200 to the self-photographing mode 2201, the shake detection unit 125 determines whether the camera is held in the photographer's hand based on a deflection amount applied to the gyro sensor or the like. When the mode is changed to the self-photographing mode 2201 and when the deflection amount is equal to or greater than the predetermined amount and thus the camera is determined to be held in the photographer's hand, the composition is changed to self-photographing face 2202. The composition of self-photographing face 2202 is a composition of a close-up on the photographer's face with the camera held in the photographer's hand to perform photographing. Even when multiple people including the photographer are photographed, zoom is adjusted so that the faces of all the subjects are fitted at the angle of view to be as large as possible.

In the case of the self-photographing mode 2201, the same composition is selected when the photographer is the only subject and when multiple people are the subjects. That is, the number of subject position estimation faces illustrated in FIG. 19 is set to the same value. The number of subject position estimation faces is the number of tracking frames (Ns, Nh, Nb) from the central position of the face tracking frame for estimating a shoulder position Xs, a head position Yh, and a body position Yb of a subject in the reference size calculation process S1215 of the composition setting "auto" in FIG. 12, as described above. In particular, by setting the number of tracking frames Ns up to the shoulder position and the number of tracking frames Nb up to the body position to be different according to the selected composition, the same reference size is calculated so that this composition is set. In the first embodiment, when a subject of one person is photographed with the composition of "face," the number of tracking frames from the central position (Xc, Yc) of the face tracking frame is the shoulder position Ns=1 and the body position Nb=1.5 and the reference size in which the vicinity of the ear or chest of the subject is set as a range fitted at the angle of view is calculated. When the plurality of subjects are photographed with the composition of "multiple people," the number of tracking frames from the central position (Xc, Yc) of the face tracking frame is the shoulder position Ns=2 and the body position Nb=3.5 and the reference size in which the vicinities of the shoulders or waists of all the subjects are set as a range fitted at the angle of view is calculated. On the other hand, in the case of self-photographing face 2202, the shoulder position Ns=1 and the body position Nb=1.5 which are the same number of tracking frames as "face" are set irrespective of the number of subjects. Accordingly, the reference size in which the vicinities of the ears or chests of all the subjects are set as a range fitted at the angle of view is calculated, and the zoom is adjusted to the angle of view appropriate for the self-photographing when the photographer is holding the camera.

When the composition is changed to self-photographing face 2202, the number of detected subjects is stored in the memory 118. In the composition state of self-photographing face 2202, a process of determining whether the number of detected subjects is changed is performed. When the number of detected subjects increases, the number of subjects stored in the memory 118 is updated instantly and the reference size is changed. When the number of subjects decreases while this state continues for a predetermined time or more, the number of subjects stored in the memory 118 is updated and the composition is changed. This is because when one subject is oriented horizontally and is temporarily undetectable as in the case of multiple people 1403, the subject is prevented from falling outside of a frame by changing the composition instantly.

When the mode is changed from the normal mode 2200 to the self-photographing mode 2201, the shake detection unit 125 determines whether the camera is put on (fixed to) a desk or the like based on the deflection amount applied to a gyro sensor or the like. When the mode is changed to the self-photographing mode 2201 and the deflection amount is less than the predetermined amount and thus the camera is determined to be put down, the composition is changed to self-photographing whole body 2203. The composition of self-photographing whole body 2203 is a composition when the camera is put down and the photographer's whole body is photographed. When multiple people including the photographer are photographed, the zoom is adjusted so that the whole bodies of all the subjects are fitted at the angle of view. In the case of self-photographing whole body 2203, the shoulder position Ns=2 and the body position Nb=10 which are the same number of tracking frames as "whole body" are set irrespective of the number of subjects. Accordingly, the reference size in which the shoulders and legs of all the subjects are set as a range fitted at the angle of view is calculated and the zoom is adjusted to the angle of view appropriate for the self-photographing in the state in which the camera is put down. When the composition is changed to self-photographing whole body 2203, the number of detected subjects is stored in the memory 118. When the number of subjects is changed as in self-photographing whole body 2203 or self-photographing face 2202, the number of subjects stored in the memory 118 is updated and the reference size is changed.

In the embodiment, the photographing scene determined according to the set mode is changed and the composition more appropriate for each mode is automatically selected by the camera. In the embodiment, the case in which the appropriate composition is selected from a plurality of composition selection candidates in one mode has been exemplified, but only one composition is a selection candidate according to the mode. Further, the cases of the normal mode and the self-photographing mode have been exemplified as the modes, but the invention is not limited to these modes. Besides the normal mode and the self-photographing mode, for example, an embodiment in which the composition of "whole body" of a competitor is selected in a sports mode or an embodiment in which the composition of "face" of a baby is selected in a baby mode may be realized.

In the embodiment, the automatic zoom control can be performed so that an appropriate composition is selected according to the photographing scene determined based on the set mode and the detection information of the camera without selection of the composition by the photographer.

Other Embodiments

The invention can also be realized as a process in which a program realizing one or more functions of the above-described embodiments is supplied to a system or a device via a network or a storage medium, and one or more processors in a computer of the system or the device reads and executes the program. The invention can also be realized by a circuit (for example, an ASIC) realizing one or more functions.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-260109, filed Dec. 24, 2014, Japanese Patent Application No. 2015-202330, filed Oct. 13, 2015, and Japanese Patent Application No. 2015-202331, filed Oct. 13, 2015, which is hereby incorporated by reference wherein in its entirety.

What is claimed is:

1. A zoom control device comprising circuitry configured to function as:
   a subject detection unit configured to detect a subject from an image;
   a setting unit configured to set a reference size of the subject used to control a zoom magnification, wherein the reference size is set based on a stationary time of the subject and a distance between the zoom control device and the subject determined based on the size of the subject detected by the subject detection unit; and
   a control unit configured to control the zoom magnification based on the reference size set by the setting unit and a size of the subject detected sequentially by the subject detection unit,
   wherein the setting unit is further configured to:
   set the reference size to a first reference size which is smaller than a second reference size, if a motion of the subject is detected under a condition the reference size is set to the second reference size, and
   set the reference size to the first reference size, if the distance between the zoom control device and the subject is determined to be greater than a first threshold value under a condition the reference size is set to the second reference size.

2. The zoom control device according to claim 1, wherein the setting unit determines the stationary time of the subject based on a change amount of the size of the subject or a change amount of a position of the subject in the image.

3. The zoom control device according to claim 1, wherein said circuitry is further configured to function as:
   a detection unit configured to determine whether the zoom control device is handheld,
   wherein the setting unit changes the reference size according to the determination that the zoom control device is handheld.

4. The zoom control device according to claim 1, wherein the setting unit changes the reference size according to the stationary time of the subject and a distance between the zoom control device and the subject determined based on the size of the subject detected by the subject detection unit and information regarding the zoom magnification controlled by the control unit.

5. The zoom control device according to claim 1, wherein a plurality of photographing modes are provided, and
   wherein the setting unit changes the reference size according to whether the self-photographing mode has been set.

6. The zoom control device according to claim 1, wherein said circuitry is further configured to function as:
- a registration unit configured to associate image information regarding a subject with attribute information regarding the subject and register the image information and the attribute information; and
- an authentication unit configured to authenticate the subject from a correlation value between a feature amount of the subject detected by the subject detection unit and a feature amount of the subject obtained from the image information of the subject registered in the registration unit.

7. The zoom control device according to claim 6, wherein the setting unit changes the reference size responsive to an authentication result by the authentication unit.

8. The zoom control device according to claim 6, wherein, the attribute information is one or more pieces of information among an age, a birth state, a sex, an initial scene composition of the person as the attribute information regarding the subject, and
wherein the setting unit changes the reference size according to one or more pieces of information among the age, the birth state, the sex, the initial scene composition of the person as the attribute information regarding the subject.

9. The zoom control device according to claim 6, wherein, the attribute information is one or more pieces of information among a kind of an object, determination information of a moving object or a stationary object, and an initial scene composition as the attribute information regarding the subject, and
wherein the setting unit changes the reference size according to one or more pieces of information among a kind of an object, determination information of a moving object or a stationary object, and an initial scene composition as the attribute information regarding the subject.

10. The zoom control device according to claim 6, wherein the zoom magnification is controlled so that the size of the subject detected by the subject detection unit is within a range of a predetermined ratio with respect to the reference size.

11. A control method performed in a zoom control device, the method comprising:
- acquiring information including size information regarding a subject detected from an image;
- setting a reference size of the subject used to control a zoom magnification, wherein the reference size is set based on a stationary time of the subject and a distance between the zoom control device and the subject determined based on the acquired size information of the subject; and
- controlling the zoom magnification based on the reference size set in the setting and a size of the subject indicated by the information regarding the subject sequentially acquired in the acquiring,
- wherein in setting of the reference size:
  - the reference size is set to a first reference size which is smaller than a second reference size, if a motion of the subject is detected under a condition the reference size is set to the second reference size, and
  - the reference size is set to the first reference size, if the distance between the zoom control device and the subject is determined to be greater than a first threshold value under a condition the reference size is set to the second reference size.

12. A non-transitory recording medium storing a control program of a zoom control device causing a computer to perform each step of a control method performed by the zoom control device, the method comprising:
- acquiring information including size information regarding a subject detected from an image;
- setting a reference size of the subject used to control a zoom magnification, wherein the reference size is set based on a stationary time of the subject and a distance between the zoom control device and the subject determined based on the acquired size information of the subject; and
- controlling the zoom magnification based on the reference size set in the setting and a size of the subject indicated by the information regarding the subject sequentially acquired in the acquiring,
- wherein in setting of the reference size:
  - the reference size is set to a first reference size which is smaller than a second reference size, if a motion of the subject is detected under a condition the reference size is set to the second reference size, and
  - the reference size is set to the first reference size, if the distance between the zoom control device and the subject is determined to be greater than a first threshold value under a condition the reference size is set to the second reference size.

13. The zoom control device according to claim 1, wherein the circuitry comprises one or more processors and memory which stores computer executable instructions executed by the one or more processors.

14. The zoom control device according to claim 1, wherein the circuitry comprises a circuit.

15. The zoom control device according to claim 1, wherein the circuitry is further configured to function as a scene composition selection unit configured to automatically select one scene composition among a plurality of scene compositions based on at least a stationary time of the subject,
- wherein the setting unit is configured to change the reference size based on the scene composition selected by the scene composition selection unit, and
- wherein the reference size is changed according to the scene composition selected by the scene composition selection unit.

16. The zoom control device according to claim 15, wherein the scene composition selection unit changes the scene composition to be selected according to the stationary time of the subject and a number of subjects detected by the subject detection unit.

17. The zoom control device according to claim 15, wherein the setting unit is configured to set the reference size based on the scene composition selected by the scene composition selection unit and the size and a position of the subject detected by the subject detection unit.

18. The zoom control device according to claim 6, wherein the circuitry is further configured to function as a scene composition selection unit configured to automatically select one scene composition among a plurality of scene compositions based on at least a stationary time of the subject,
- wherein the setting unit is configured to change the reference size based on the scene composition selected by the scene composition selection unit, and
- wherein the reference size is changed according to the scene composition selected by the scene composition selection unit.

19. The zoom control device according to claim 18, wherein the scene composition selection unit changes an initial scene composition selected when the subject is authenticated, according to the attribute information regarding the subject authenticated by the authentication unit.

20. The zoom control device according to claim 18, wherein, in regard to the scene composition selected by the scene composition selection unit, the setting unit changes the reference size according to the attribute information regarding the subject authenticated by the authentication unit.

21. The zoom control device according to claim 18, wherein the scene composition selection unit changes the scene composition from the initial scene composition according to information regarding the subject detected by the subject detection unit.

22. The zoom control device according to claim 18, wherein the plurality of scene compositions differ in a ratio of the size of the subject to a screen size.

23. The zoom control device according to claim 16, wherein the setting unit is configured to set the reference size based on the scene composition selected by the scene composition selection unit and the size and a position of the subject detected by the subject detection unit.

24. The zoom control device according to claim 1, wherein the reference size is changed responsive to a change to the stationary time of the subject, and a first reference size is smaller than a second reference size, the first reference size is set when the subject is moving and the second reference size is set when the stationary time of the subject is larger than a predetermined time.

25. The zoom control device according to claim 1, wherein the setting unit is further configured to set the reference size to the first reference size, if the distance between the zoom control device and the subject is a second threshold value or less and the subject is determined to be stopped for a predetermined time or more.

* * * * *